United States Patent
Ajala et al.

(10) Patent No.: US 12,484,801 B2
(45) Date of Patent: Dec. 2, 2025

(54) DEEP LEARNING-BASED AUTOMATED PARAMETER OPTIMIZATION AND THERAPY SYSTEM FOR DEEP BRAIN STIMULATION

(71) Applicants: GE Precision Healthcare LLC, Milwaukee, WI (US); University Health Network, Toronto (CA)

(72) Inventors: Afis Ajala, Schenectady, NY (US); Jianwei Qiu, Rexford, NY (US); John Karigiannis, Laval (CA); Radhika Madhavan, Latham, NY (US); Desmond Teck Beng Yeo, Clifton Park, NY (US); Thomas Kwok-Fah Foo, Clifton Park, NY (US); Andres M. Lozano, Toronto (CA); Alexandre Boutet, Toronto (CA); Jurgen Germann, Toronto (CA)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 560 days.

(21) Appl. No.: 17/974,867

(22) Filed: Oct. 27, 2022

(65) Prior Publication Data
US 2024/0138698 A1 May 2, 2024

(51) Int. Cl.
*A61B 5/055* (2006.01)
*A61B 5/00* (2006.01)
(Continued)

(52) U.S. Cl.
CPC ............ *A61B 5/055* (2013.01); *A61B 5/7264* (2013.01); *A61B 5/7267* (2013.01);
(Continued)

(58) Field of Classification Search
CPC ..... A61B 5/055; A61B 5/4836; A61B 5/7264; A61B 5/7267; G06T 7/0012;
(Continued)

(56) References Cited

U.S. PATENT DOCUMENTS 8,315,703 B2 * 11/2012 Lozano .............. A61N 1/36082
607/45
10,420,937 B2 * 9/2019 Pilly ........................ A61B 5/24
(Continued)

OTHER PUBLICATIONS

Boutet, Alexandre, et al. "Predicting optimal deep brain stimulation parameters for Parkinson's disease using functional MRI and machine learning." Nature communications 12.1 (2021): 3043. (Year: 2021).*
(Continued)

*Primary Examiner* — Sumati Lefkowitz
*Assistant Examiner* — Ryan P Potts
(74) *Attorney, Agent, or Firm* — Fletcher Yoder, P.C.

(57) ABSTRACT

A system for optimizing DBS parameters for a subject includes automatically performing actions via a processor. The actions include obtaining functional MRI data of a brain of the subject acquired utilizing an MRI system during DBS of the brain utilizing a first set of DBS parameters. The actions include generating functional MRI response maps from the functional MRI data. The actions include extracting, utilizing an unsupervised autoencoder-based neural network, features from the functional MRI response maps. The actions include determining, utilizing a deep learning-based DBS parameter classification model, whether the first set of DBS parameters are optimal DBS parameters for the subject based on the features. The actions include, when the first set of DBS parameters are not the optimal DBS parameters, predicting, utilizing a deep learning-based DBS parameter prediction model, a second set of DBS parameters that are the optimal DBS parameters for the subject based on the features.

15 Claims, 17 Drawing Sheets

(51) Int. Cl.
| | |
|---|---|
| *A61N 1/05* | (2006.01) |
| *A61N 1/36* | (2006.01) |
| *G06T 7/00* | (2017.01) |
| *G06V 10/40* | (2022.01) |
| *G06V 10/764* | (2022.01) |
| *G06V 10/774* | (2022.01) |

(52) U.S. Cl.
CPC ....... *A61N 1/0534* (2013.01); *A61N 1/36139* (2013.01); *G06T 7/0012* (2013.01); *G06V 10/40* (2022.01); *G06V 10/764* (2022.01); *G06V 10/774* (2022.01); *A61B 5/4836* (2013.01); *A61N 1/36067* (2013.01); *A61N 1/36082* (2013.01); *A61N 1/36096* (2013.01); *A61N 1/36103* (2013.01); *G06T 2207/10088* (2013.01)

(58) Field of Classification Search
CPC ........ G06T 2207/10088; A61N 1/0534; A61N 1/36139; A61N 1/36103; A61N 1/36067; A61N 1/36082; A61N 1/36096; G06V 10/40; G06V 10/764; G06V 10/774
See application file for complete search history.

(56) References Cited

U.S. PATENT DOCUMENTS

| | | | |
|---|---|---|---|
| 10,905,882 B2 | 2/2021 | Madhavan et al. | |
| 2007/0185544 A1 | 8/2007 | Dawant et al. | |
| 2020/0086047 A1 | 3/2020 | Lozano et al. | |
| 2021/0150671 A1* | 5/2021 | Guo | G16H 30/40 |
| 2022/0323766 A1* | 10/2022 | Hughes | A61N 1/025 |

OTHER PUBLICATIONS

Wen, Tingxi, and Zhongnan Zhang. "Deep convolution neural network and autoencoders-based unsupervised feature learning of EEG signals." IEEE Access 6 (2018): 25399-25410. (Year: 2018).*

Merk, Timon, et al. "Machine learning based brain signal decoding for intelligent adaptive deep brain stimulation." Experimental Neurology 351 (2022): 113993. (Year: 2022).*

Xia, Ping. "Advances in the Deep Brain Stimulation for Parkinson's Disease." 2021 International Conference on Signal Processing and Machine Learning (CONF-SPML). IEEE, 2021. (Year: 2021).*

Stuart, Morgan, et al. "Machine learning for deep brain stimulation efficacy using dense array EEG." 2019 12th international conference on human system interaction (HSI). IEEE, 2019. (Year: 2019).*

Watts, Jeremy, et al. "Machine learning's application in deep brain stimulation for Parkinson's disease: a review." Brain Sciences 10.11 (2020): 809. (Year: 2020).*

Franzini et al., "Ablative Brain Surgery: an Overview," International Journal of Hyperthermia, Sep. 20, 2019, pp. 64-80, vol. 36, No. 2, Taylor & Francis Group, LLC.

Ajala et al., "Autoencoder-Based Deep Learning Classifier for Deep Brain Stimulation Parameter Settings by fMRI," Jun. 2022, https://www.researchgate.net/publication/363763337, 6 pgs.

Boutet et al., "Predicting Optimal Deep Brain Stimulation Parameters for Parkinson's Disease Using Functional MRI and Machine Learning," Nature Communications, 2021, 13 pgs, https://doi.org/10.1038/s41467-021-23311-9 | www.nature.com/naturecommunications.

Elias et al., "Probabilistic Mapping of Deep Brain Stimulation: Insights from 15 Years of Therapy," Neurology Grand Rounds, pp. 426-443; Wiley Publications; 2020; American Neurological Association.

Harmsen et al., "Clinical Trials for Deep Brian Stimulation: Current Sate of Affairs," Brain Stimulation 13, 2020, pp. 378-385.

Heldman et al., "Computer-Guided Deep Brain Stimulation Programming for Parkinson's Disease," Department of Health and Human Services, Feb. 1, 2017, 12 pgs.

Krauss et al., "Technology of Deep Brain Stimulation: Current Status and Future Directions," Nature Reviews, Neurology, Nov. 26, 2020, https://doi.org/10.1038/s41582-020-00426- z, 13 pgs.

Krishna et al., "A Review of the Current Therapies, Challenges, and Future Directions of Transcranial Focused Ultrasound Technology: Advances in Diagnosis and Treatment," American Medical Association, Feb. 2018, pp. 246-254, vol. 75, No. 2, JAMA Neurology.

Picillo et al., "Programming Deep Brain Stimulation for Parkinson's Disease: The Toronto Western Hospital Algorithms," Brain Stimulation Journal, 2016, 13 pgs, Elsevier Inc., http://dx.doi.org/10.1016/j.brs.2016.02.004.

Picillo et al., "Programming Deep Brain Stimulation for Tremor and Dystonia: The Toronto Western Hospital Algorithms," Brain Stimulation Journal, 2016, 15 pgs, Elsevier Inc., http://dx.doi.org/10.1016/j.brs.2016.02.003.

Lozano et al., "Deep Brain Stimulation: Current Challenges and Future Directions," Mar. 2019, 30 pgs, National Review Neurology.

Lozano et al., "Probing and Regulating Dysfunctional Circuits Using Deep Brain Stimulation," Cel Press, Feb. 6, 2013, 19 pgs, Elsevier Inc., http://dx.doi.org/10.1016/j.neuron.2013.01.020.

Volkmann et la., "Basic Algorithms for the Programming of Deep Brain Stimulation in Parkinson's Disease," Movement Disorders, 2006, pp. 284-289, vol. 21, Suppl 14.

* cited by examiner

| Parameters | MLP |
|---|---|
| Accuracy | 0.96 ± 0.04 |
| Precision | 0.95 ± 0.07 |
| Recall | 0.92 ± 0.07 |
| F1 score | 0.93 ± 0.06 |

| DBS parameter | Accuracy(%) at (10% tolerance) | Accuracy (%) at (15% tolerance) |
|---|---|---|
| Voltage (V) | 80.13 | 89.88 |
| Frequency (Hz) | 85.12 | 89.28 |
| Contact X-location (mm) | 82.14 | 94.04 |
| Contact Y-location (mm) | 83.33 | 93.62 |
| Contact Z-location (mm) | 73.81 | 75.00 |

DEEP LEARNING-BASED AUTOMATED PARAMETER OPTIMIZATION AND THERAPY SYSTEM FOR DEEP BRAIN STIMULATION

BACKGROUND

The subject matter disclosed herein relates to deep brain stimulation DBS, and, more particularly, to a deep learning based automated parameter optimization and therapy system for deep brain stimulation.

Deep brain stimulation (DBS) is used for treating disabling neurological symptoms and psychiatric disorders. The procedure uses a neurostimulator to deliver electrical stimulation to the brain by way of surgically implanted electrodes. Depending on the condition being treated, the electrodes can be used to target certain regions or tissues within the brain or can be targeted toward areas of the brain that control movement, regulate abnormal impulses, or emotions etc. For example, in this later case, the electrical stimulation can be used to disrupt abnormal nerve signals that cause tremor and/or other neurological symptoms. Over the past 20 years, more than 100,000 Parkinson's disease, essential tremor, dystonia and obsessive-compulsive disorder patients have seen significant symptom relief due to DBS treatment. However, the number of patients having received DBS treatment is relatively small compared to the number of patients available for DBS treatment. Accumulating evidence now indicates that patients with chronic pain, post-traumatic stress disorder, depression and obesity may also benefit from DBS treatments.

Despite the long history of DBS, its underlying principles and mechanisms are still not clear. In particular, the understanding of how the brain responds to different DBS parameters, such as electrode contact choice, stimulation direction, frequency, current/voltage and pulse width is limited. While movement disorders such as Parkinson's disease provide immediate clinical feedback, several other neurological disorders, such as dystonia, addiction, depression, etc., treated with DBS provide no real time feedback mechanism to let a clinician decide whether DBS has had its intended effect or whether the stimulation parameters are optimal for each individual patient. The immediate clinical feedback seen in Parkinson's disease patients is useful, but the DBS parameter optimization is still currently determined via subjective patient observation because of the absence of measurable biomarkers of optimized patients in current standard of care DBS optimization protocol. Accordingly, the selection of optimal DBS parameters that may best mitigate symptoms in a patient is largely based on trial and error. Specifically, existing methods for selection of optimal DBS excitation parameters are iterative processes that often requires numerous clinic visits by the patient to test the large number of possible stimulation parameters, with the patient being monitored over time (roughly 6-8 weeks) to see how the patient evolves and determine if symptoms improve. In the standard-of-care DBS optimization protocol, the programming parameters are manually and sequentially adjusted until an optimal parameter combination is reached as determined by the neurologist. This monitoring extends over a signification period of time, often 1 year or longer, resulting in a lengthy optimization period. The current empirical optimization protocol substantially increases the DBS therapy duration per patient, increases the financial burden on the patient, and ultimately limits the number of patients that can have access to DBS therapy. The difficulty of the current manual method is even greater given that the number of possible stimulation parameters has increased with the more effective modern DBS electrodes with stimulation directionality and a larger therapeutic window.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for optimizing DBS parameters for a subject is provided. The system includes a memory encoding processor-executable routines. The system also includes a processor configured to access the memory and to execute the processor-executable routines, wherein the routines, when executed by the processor, cause the processor to automatically perform actions. The actions include obtaining functional magnetic resonance imaging (MRI) data of a brain of the subject acquired utilizing an MRI system during DBS of the brain with a DBS system utilizing a first set of DBS parameters. The actions also include generating functional MRI response maps from the functional MRI data. The actions further include extracting, utilizing an unsupervised autoencoder-based neural network, subject specific features from the functional MRI response maps. The actions still further include determining, utilizing a deep learning-based DBS parameter classification model, whether the first set of DBS parameters are optimal DBS parameters for the subject based on the subject specific features. The actions yet further include, when the first set of DBS parameters are not the optimal DBS parameters, predicting, utilizing a deep learning-based DBS parameter prediction model, a second set of DBS parameters that are the optimal DBS parameters for the subject based on the subject specific features.

In another embodiment, a computer-implemented method for optimizing DBS parameters for a subject is provided. The method includes automatically obtaining, via a processor, functional MRI data of a brain of the subject acquired utilizing an MRI system during DBS of the brain with a DBS system utilizing a first set of DBS parameters. The method also includes automatically generating, via the processor, functional MRI response maps from the functional MRI data. The method further includes automatically extracting, via the processor, utilizing an unsupervised autoencoder-based neural network, subject specific features from the functional MRI response maps. The method still further includes automatically determining, via the processor, utilizing a deep learning-based DBS parameter classification model, whether the first set of DBS parameters are optimal DBS parameters for the subject based on the subject specific features. The method yet further includes, when the first set of DBS parameters are not the optimal DBS parameters, automatically predicting, via the processor, utilizing a deep learning-based DBS parameter prediction model, a second set of DBS parameters that are the optimal DBS parameters for the subject based on the subject specific features.

In a further embodiment, a non-transitory computer-readable medium, the computer-readable medium comprising processor-executable code that when executed by a processor, causes the processor to automatically perform actions. The actions include obtaining functional MRI data of a brain of the subject acquired utilizing an MRI system during DBS of the brain with a DBS system utilizing a first set of DBS parameters. The actions also include generating functional MRI response maps from the functional MRI data. The actions further include extracting, utilizing an unsupervised autoencoder-based neural network, subject specific features from the functional MRI response maps. The actions still further include determining, utilizing a deep learning-based DBS parameter classification model, whether the first set of DBS parameters are optimal DBS parameters for the subject based on the subject specific features. The actions yet further include, when the first set of DBS parameters are not the optimal DBS parameters, predicting, utilizing a deep learning-based DBS parameter prediction model, a second set of DBS parameters that are the optimal DBS parameters for the subject based on the subject specific features.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
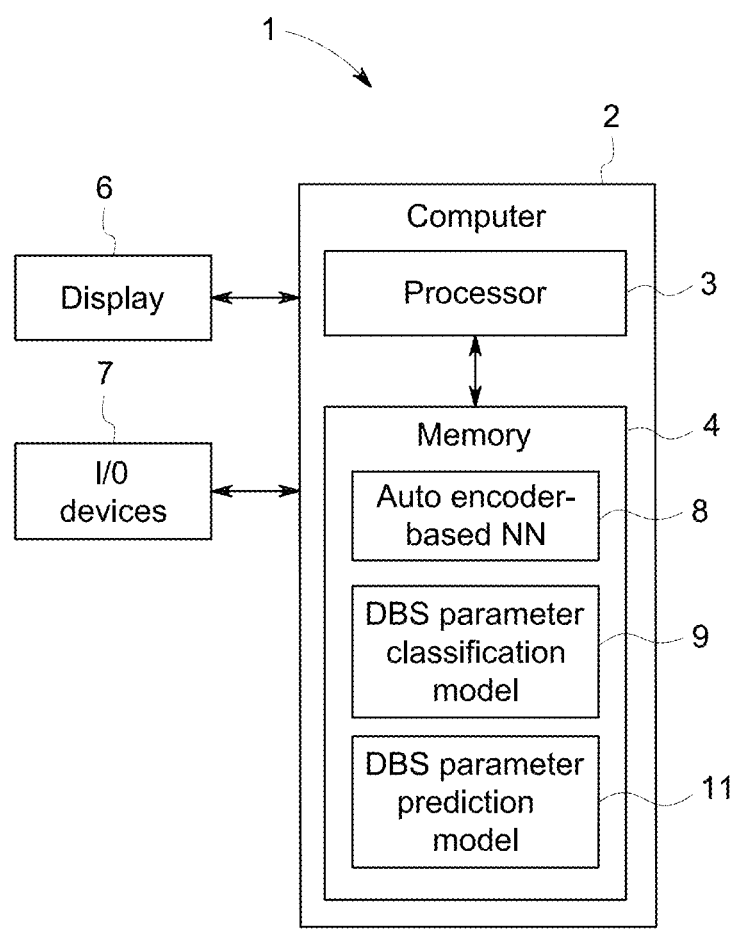
FIG. 1 is a schematic block diagram of a system for predicting optimal deep brain stimulation (DBS) parameters for DBS patient treatment, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, the terms "stimulation," "stimulated," "activation," and "activated" refer to any artificial input that causes one or more neuro-modulatory effects (e.g., excitation/activation, inhibition, conduction block, modulation of response to other inputs, or the like) in at least a portion of neurons in a target tissue. The stimulation can be electrical stimulation and the target tissue can be neural tissue, such as a portion of the brain. Accordingly, the stimulation can be used for deep brain stimulation, according to an example embodiment.

As used herein, the terms "parameter," "parameter for stimulation," and "stimulus parameter" refer to a measure that can be one of a set of parameters that define the stimulation. In some instances, the parameters for stimulation can include voltage, frequency, stimulation direction, and pulse width, as well as a stimulation configuration (e.g., which contact is selected to apply the stimulation and to what intensities, timing, etc.), with one or more of these parameters being selectively controlled.

As used herein, the term "imaging" can refer to a technique of creating a visual representation of the interior of a body for clinical analysis. Examples of medical imaging can include structural imaging and functional imaging. Structural imaging can reveal the underlying structure of at least a portion of the body. Functional imaging can provide direct or indirect measurements of physiological activity (e.g., neural activity). Examples of functional imaging modalities can include functional magnetic resonance imaging (fMRI), evoked potentials, local field potential (LFP), electrocorticography (ECoG), electroencephalography (EEG), magnetoencephalography (MEG), electromyography (EMG), positron emission tomography (PET), magnetic resonance spectroscopy (MRS), single-photon emission computed tomography (SPECT), near-infrared (NIR) spectroscopy, optical tomography (OT), ultrasound, laser Doppler measurements, and the like.

As used herein, the terms "optimal" and "sub-optimal" can be measures of clinical efficacy. For example, when a stimulation is deemed optimal, it can refer to a stimulation parameter being used that produces a stimulation with a clinically relevant outcome. When a stimulation is deemed sub-optimal, it can refer to a stimulation parameter being used that produces a stimulation with an outcome below clinical relevance. For example, in some instances, a sub-optimal stimulation is 15% or more different than a clinically relevant stimulation.

As used herein, the term "disease" is meant to refer to any neurological condition, neurological symptom, or psychiatric disorder that is suitable for treatment by functional neurosurgery, such as DBS.

Machine learning techniques, whether deep learning networks or other experiential/observational learning system, can be used to locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Throughout the specification and claims, the following terms take the meanings explicitly associated herein, unless the context clearly dictates otherwise. The term "deep learning" is a machine learning technique that utilizes multiple data processing layers to recognize various structures in data sets and classify the data sets with high accuracy. A deep learning network can be a training network (e.g., a training network model or device) that learns patterns based on a plurality of inputs and outputs. A deep learning network can be a deployed network (e.g., a deployed network model or device) that is generated from the training network and provides an output in response to an input.

The present disclosure provides for techniques for optimizing DBS parameters. In particular, the disclosed techniques include obtaining functional MRI data of a brain of the subject acquired utilizing an MRI system during DBS of the brain with a DBS system utilizing a first set of DBS parameters and generating functional MRI response maps from the functional MRI data. The disclosed techniques also include extracting, utilizing an unsupervised autoencoder-based neural network, subject specific features (e.g., latent vectors) from the functional MRI response maps. The disclosed techniques further include determining, utilizing a deep learning-based DBS parameter classification model, whether the first set of DBS parameters are optimal DBS parameters for the subject based on the subject specific features. The disclosed techniques yet further include, when the first set of DBS parameters are not the optimal DBS parameters, predicting, utilizing a deep learning-based DBS parameter prediction model, a second set of DBS parameters that are the optimal DBS parameters for the subject based on the subject specific features. The steps of the disclosed techniques may be performed iteratively until the optimal DBS parameters specific to a patient are obtained. The disclosed techniques enable the optimal DBS parameters to be obtained in a single day clinical visit as opposed to a number of months typically needed to obtain clinical parameters. As a result, the amount of time and money spent by the patient is reduced and the number of patients that may receive DBS is increased. In addition, the disclosed techniques, without utilizing region of interest (ROI)-based feature selection and without any ROI-based normalization, have a higher overall accuracy to other techniques with regard to obtaining optimal DBS parameters. Further, the disclosed techniques are configured to handle the number of possible additional stimulation parameters provided by newer DBS electrodes.

Although the disclosed techniques are discussed with regard to functional MRI, they may be utilized with any functional imaging that can capture neural modulation. In addition, although the disclosed techniques are discussed with regard to DBS, they may be utilized to optimize other neurological disease treatment procedures such as radiofrequency thermal ablation, stereotactic radiosurgery, laser interstitial thermal therapy, and magnetic resonance-guided focused ultrasound thermal ablation.

Referring to FIG. 1, an example of a basic system 1 for predicting optimal DBS parameters for a patient of interest is illustrated, in accordance with an embodiment of the invention. The system 1 is depicted as being implemented using a computer 2 that is programmed and/or configured to predict optimal DBS parameters according to an aspect of the invention. DBS parameters are optimized when they are well tolerated by the patient and they yield a substantial reduction or total removal of the patient's neurological symptoms. The computer 2 can be a workstation, a stand-alone computer, a notebook computer, or it can be implemented as part of other microprocessor-based equipment that is programmed based on the teachings contained herein.

The computer 2 includes a processor 3 that is operative to execute instructions for performing the methods described herein. The instructions can be stored in associated memory 4. An unsupervised autoencoder-based neural network 8 (e.g., deep learning-based neural network) for extracting subject specific features (e.g., latent vectors) from functional MRI response maps in accordance to the disclosed techniques is stored on the memory 4. In addition, a deep learning-based DBS parameter classification model 9 for determining if a given set of DBS parameters are optimal DBS parameters for the subject based on the subject specific features in accordance to the disclosed techniques is stored on the memory 4. Further, a deep learning-based DBS parameter prediction model 11 for predicting/outputting a different set of DBS parameters (when the given set of DBS parameters are not the optimal DBS parameters according to the DBS parameter classification model 9) that are the optimal DBS parameters for the subject based on the subject specific features in accordance to the disclosed techniques is stored on the memory 4. The unsupervised autoencoder-based neural network 8, the DBS parameter classification model 9, and/or the DBS parameter prediction model 11 may be loaded into and run by the processor 3. As used herein, the optimal DBS parameters represent one or more of a voltage, frequency, pulse width, stimulation direction, and DBS electrode contact (i.e., contact location) used for applying a DBS signal/treatment, that can be selectively controlled to achieve an optimal therapeutic effect. In certain embodiments, more than these DBS parameters may be determined or predicted utilizing the disclosed techniques.

The system 1 can also include a display 6 that can be utilized to represent the results and calculations performed by the predictor algorithm, as well as one or more other input or output devices 7. Such devices 7 can provide an interface through which a user can input data as well as control the predictor algorithm 5. For example, a user can employ the I/O device 7 to input data, such as instructions to initiate or modify the predictor algorithm procedure. A user can also employ the I/O device 7 to set the range of parameters, the granularity of such parameters as well as to program other parameters being used in the procedure. The I/O device 7 can also be utilized to interface and enable acquisition of data (e.g., imaging data) from an associated imaging device, such as a magnetic resonance imaging (MRI) system, a computer tomography (CT) system or other imaging or acquisition modality that can provide data on a functional brain response responsive to DBS. Still further, the I/O device can be employed to access a brain atlas database, such as from another location in the memory 4 or from another storage location or device.

Figure 2:
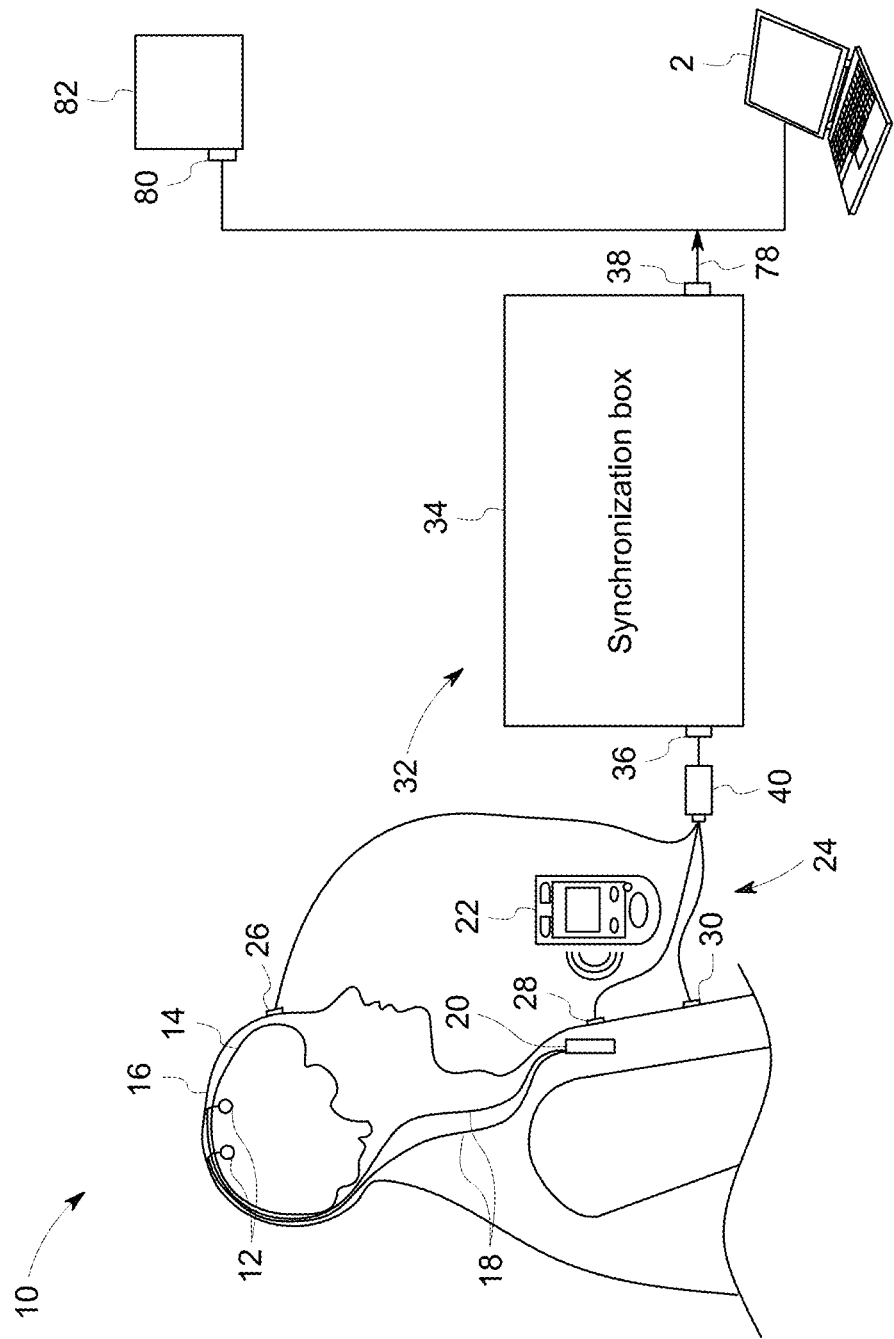
FIG. 2 is a schematic diagram of a DBS treatment and detection system usable with the system of FIG. 1, in accordance with aspects of the present disclosure.

Referring now to FIG. 2, a deep brain stimulation (DBS) treatment and detection system 10 is illustrated that is usable with the system 1 of FIG. 1. The DBS system 10 includes one or more leads or electrodes 12 surgically implanted within one or more regions of the brain 14 of a patient 16. Each implanted electrode 12 is configured to apply stimulation signals to a targeted region of the brain 14. While two electrodes 12 are illustrated in FIG. 1, it will be understood that system 10 may include a single implanted electrode as well as three or more electrodes, each of which may be positioned and configured to facilitate unipolar or bipolar stimulation.

Each implanted electrode 12 is connected through an extension wire 18 that is passed under the skin of the patient 16 to a pulse generator 20 configured to deliver stimulation signals to electrodes 12. Pulse generator 20 may include a power supply (not shown) such as a battery or other type of power storage device and microelectronic circuitry (not shown) that may include hardware and/or software for generating and outputting stimulation signals in response to control signals or commands. In some embodiments, pulse generator 20 may further include a storage unit (not shown) that permits patient-specific data to be stored within the pulse generator 20.

In the illustrated embodiment, pulse generator 20 is an internal pulse generator that is implanted beneath the skin of the patient 16, such as, for example, under the clavicle as shown in FIG. 1. However, internal pulse generator 20 may be located elsewhere within the patient 16 in alternative embodiments such as, for example, lower in the chest or over the abdomen. In alternative embodiments, pulse generator 20 may be an external device coupled to implanted electrodes 12.

Figure 3:
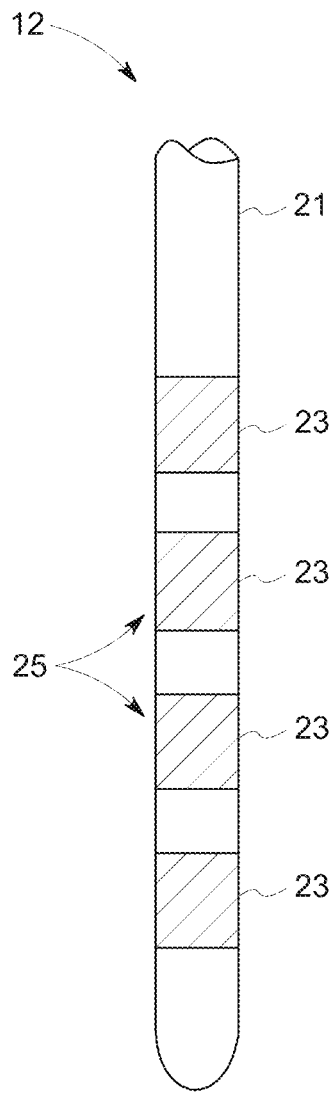
FIG. 3 is a schematic diagram of a DBS electrode useable with the disclosed techniques.

In the case of an implanted pulse generator, the pulse generator 20 is programmed with a wireless device 22 that is held over the skin of the patient 16 proximate the implanted location of the pulse generator 20. The programming defines the excitation parameters of the DBS, which can be adjusted as the patient's condition changes over time. The circuitry within the pulse generator 20 generates pulse sequences in accordance with the stimulation parameters that send excitation signals to implanted electrodes 12. The stimulation can be provided in a continuous or cycling fashion and at various voltages, frequencies, stimulation directions, and pulse widths, based on the desired treatment. Additionally, different contacts of the electrodes 12 may be activated to apply the stimulation, as illustrated in FIG. 3, where an electrode 12 is shown in greater detail as including a housing 21 extending along a length thereof and a plurality of contacts 23 positioned along a length of electrode 12 and housing 21 at a plurality of defined contact levels 25. Each contact level 25 may have two or more contacts 23 located at different angular positions around the circumference of housing 21. In certain embodiments, the pulse generator 20 may be programmed (either directly or via wireless device 22) to generate pulse sequences that sweep through the multi-dimensional DBS parameter space, including sweeping through one or more of voltages, frequencies, pulse widths, stimulation direction, and different contacts of the electrodes 12. As depicted in FIG. 3, the electrode 12 includes 4 contacts 23. In certain embodiments, the electrode 12 may include a different number of contacts 23 (e.g., 6, 8, 10, 12, 14, 16, 18, 20, or any other number of contacts 23).

Referring again to FIG. 2, a sensor system 24 is provided to sense and track the stimulation signal transmitted by the internal pulse generator 20 to the implanted electrodes 12. In one embodiment, sensor system 24 is an arrangement of three EKG electrodes 26, 28, 30 that are affixed to the skin surface of the patient 16 to measure bioelectrical signals from the patient 16, which include physiological signals generated by the patient's anatomy (e.g., the heart) and voltages generated by the small currents flowing through the patient 16 as a consequence of the DBS. In the illustrated embodiment, EKG electrodes 26, 28, 30 are applied to the patient 16 proximate the forehead, near the internal pulse generator 20, and abdomen respectively and may be used to sense a DBS excitation pattern generated by implanted electrodes 12 configured for bipolar and/or monopolar operation modes. However, a skilled artisan will recognize that EKG electrodes 26, 28, 30 may be positioned in alternative locations on the patient 16 such as on the multiple locations on the chest or left arm, right arm, and at a reference location, as non-limiting examples, in embodiments that utilize electrodes 12 configured for monopolar operation. In yet alternative embodiments, sensor system 24 may include sensors provided in the form of loops or plates (not shown) that are configured to pick up the DBS signals through inductive or capacitive coupling to the internal pulse generator 20.

A synchronization box 32 is used in conjunction with the sensor system 24 to detect the DBS excitation pattern generated by the internal pulse generator 20 and transform the detected signal into a pulse sequence that emulates the detected pattern. Synchronization box 32 includes a housing 34 with at least one input port 36 and at least one output port 38. A bio-amplifier 40 is coupled between sensor system 24 and the input port 36 of synchronization box 32 to electrically isolate the patient 16 from the synchronization box 32 and amplify the incoming signal from DBS electrodes 12. In an alternative, embodiment bio-amplifier 40 may be integrated within the housing 34 of synchronization box 32.

The synchronization box 32 is configured to transform bioelectrical signals received from sensor system 24 into a series of pulses that represent predicted active periods and non-active periods of a cyclic deep brain stimulation. In one embodiment, the output of synchronization box 32 is in the form of a log of time stamps that predict the start time and duration of future active transmission periods of neurological excitation. In another embodiment, the output generated by synchronization box 32 is in the form of a series of timing pulses. The timing pulses of the output signal simulate the envelope of the cyclic DBS excitation pattern, with the pulse width of each timing pulse approximating the duration of an active or ON portion of a respective ON/OFF cycle.

Data measured in real time, including the time stamps of the measured and predicted pulses can be output from the synchronization box 32 via output port 38 of synchronization box 32—such that data corresponding to the detected DBS excitation pattern received from sensor system 24 and a digital logic pulse or output timing signal 78 generated by synchronization box 32 are provided via output port 38. According to one embodiment, the output port 38 of synchronization box 32 is coupled to an auxiliary trigger input or input data acquisition board 80 of an imaging device 82, such as the auxiliary input 84 of MRI scanner 86 illustrated in FIG. 4, and is used to trigger the start of an image data acquisition sequence such as, for example, an fMRI scan, in order to provide for alignment of DBS electrode stimulation periods with fMRI scan data acquisition. According to one embodiment, the output port 38 of synchronization box 32 is coupled to computer 2 (FIG. 1) such that data corresponding to the detected DBS excitation pattern received from sensor system 24 and a digital logic pulse or output timing signal 78 generated by synchronization box 32 are provided thereto. While synchronization box 32 is depicted as a standalone device in FIG. 2, it is contemplated that the components or the software equivalents thereof can be incorporated directly within imaging device 82 in an alternative embodiment.

While the above DBS system 10 is described as including synchronization box 32 in order to provide for alignment of DBS electrode stimulation periods with fMRI scan data acquisition when using an ON/OFF DBS cycling, it is recognized that synchronization box 32 would not be required if continuous DBS is applied. That is, Mill scan data could be acquired with the DBS constantly firing at two different settings and comparing their connectivity; in which case synchronization box 32 is not required, as the continuous DBS and Mill scan data acquisition would inherently be synchronous with one another.

Figure 4:
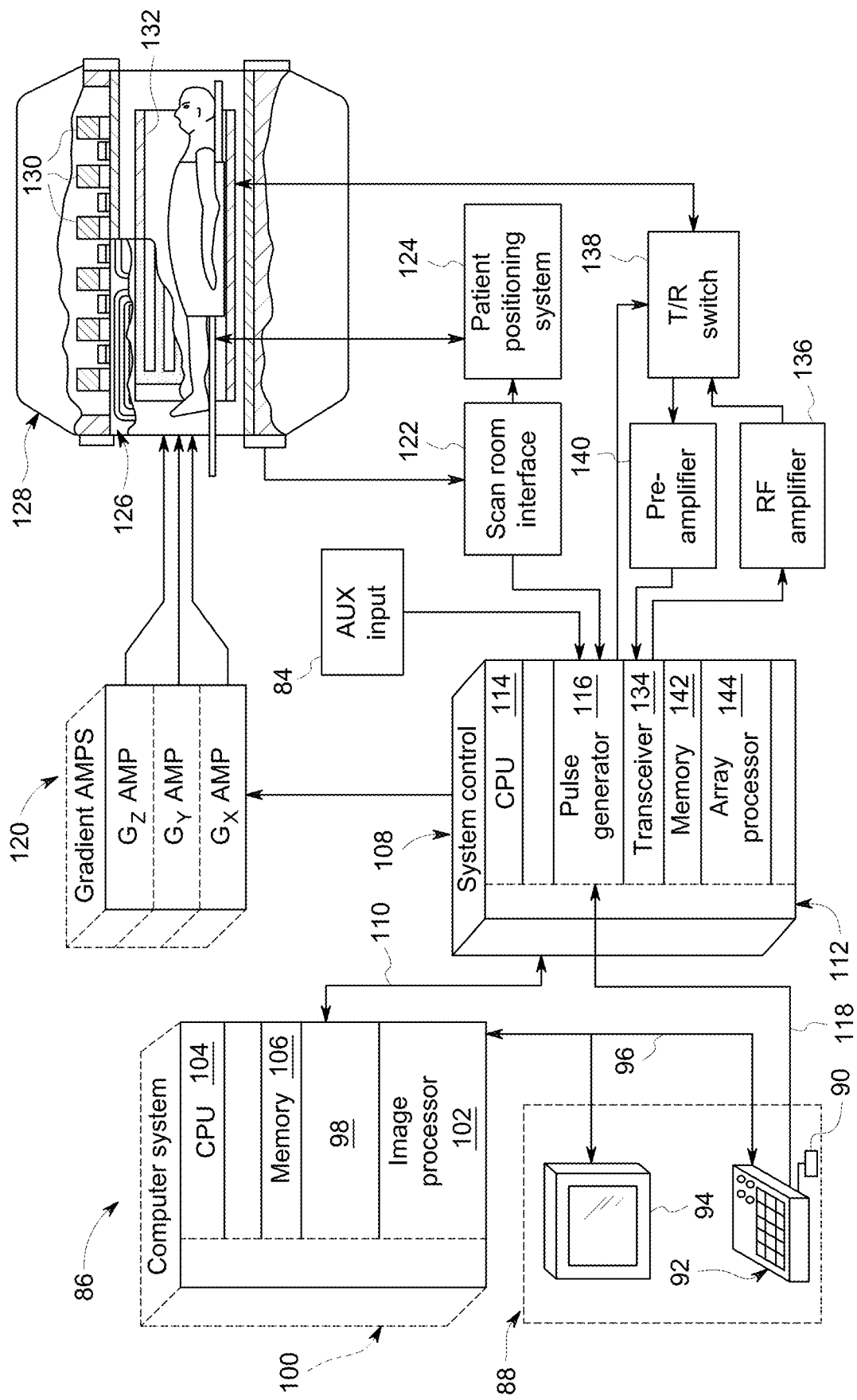
FIG. 4 is a schematic diagram of a magnetic resonance imaging (MRI) system usable with the system of FIG. 1 and the DBS treatment and detection system of FIG. 2, in accordance with aspects of the present disclosure.

Referring now to FIG. 4, the major components of an MRI scanner or system 86 useable with the system 1 of FIG. 1 and the DBS system 10 of FIG. 2. The operation of the MRI scanner 86 is controlled for certain functions from an operator console 88, which in this example includes a keyboard or other input device 90, a control panel 92, and a display screen 94. The operator console 88 communicates through a link 96 with a separate computer system 98 that enables an operator to control the production and display of images on the display screen 94. The computer system 98 includes a number of modules which communicate with each other through a backplane 100. These modules include an image processor module 102, a CPU module 104 and a memory module 106, known in the art as a frame buffer for storing image data arrays. The computer system 98 communicates with a separate system control 108 through a high-speed serial link 110. The input device 90 can include a mouse, joystick, keyboard, track ball, touch activated screen, light wand, voice control, card reader, push-button, or any similar or equivalent input device, and may be used for interactive geometry prescription.

The system control 108 includes a set of modules connected together by a backplane 112. These include a CPU module 114 and a pulse generator module 116 which connects to the operator console 88 through a serial link 118. It is through serial link 118 that the system control 108 receives commands from the operator to indicate the scan sequence that is to be performed. The pulse generator module 116 operates the system components to carry out the desired scan sequence and produces data which indicates the timing, strength and shape of the RF pulses produced, and the timing and length of the data acquisition window. The pulse generator module 116 connects to a set of gradient amplifiers 120, to indicate the timing and shape of the gradient pulses that are produced during the scan. The pulse generator module 116 can also receive timing data through an auxiliary trigger input 84, which may be coupled to output of the synchronization box 32 of FIG. 2. And finally, the pulse generator module 116 connects to a scan room interface circuit 122 which receives signals from various sensors associated with the condition of the patient and the magnet system. It is also through the scan room interface circuit 122 that a patient positioning system 124 receives commands to move the patient to the desired position for the scan.

The gradient waveforms produced by the pulse generator module 116 are applied to the gradient amplifier system 120 having Gx, Gy, and Gz amplifiers. Each gradient amplifier excites a corresponding physical gradient coil in a gradient coil assembly generally designated 126 to produce the magnetic field gradients used for spatially encoding acquired signals. The gradient coil assembly 126 forms part of a resonance assembly 128 which includes a polarizing magnet 130 and a whole-body RF coil 132. A transceiver module 134 in the system control 108 produces pulses which are amplified by an RF amplifier 136 and coupled to the whole-body RF coil 132 by a transmit/receive switch 138. The resulting signals emitted by the excited nuclei in the patient may be sensed by the same whole-body RF coil 132 and coupled through the transmit/receive switch 138 to a preamplifier 140. The amplified MR signals are demodulated, filtered, and digitized in the receiver section of the transceiver module 134. The transmit/receive switch 138 is controlled by a signal from the pulse generator module 116 to electrically connect the RF amplifier 136 to the whole-body RF coil 132 during the transmit mode and to connect the preamplifier 140 to the whole-body RF coil 132 during the receive mode. The transmit/receive switch 138 can also enable a separate RF coil (for example, a surface coil) to be used in either the transmit or receive mode.

The MR signals picked up by the whole-body RF coil 132 are digitized by the transceiver module 134 and transferred to a memory module 142 in the system control 108. A scan is complete when an array of raw k-space data has been acquired in the memory module 142. This raw k-space data is rearranged into separate k-space data arrays for each image to be reconstructed, and each of these is input to an array processor 144 which operates to Fourier transform the data into an array of image data. This image data is conveyed through the serial link 110 to the computer system 98 where it is stored in memory. In response to commands received from the operator console 88 or as otherwise directed by the system software, this image data may be archived in long term storage or it may be further processed by the image processor module 102 and conveyed to the operator console 88 and presented on the display screen 94.

Operation of MRI scanner 86 to acquire fMRI scan data study produces a chronologically ordered sequence (or "time series") of MRI (magnetic resonance imaging) images, each of which represents a three-dimensional "snapshot" of the subject's brain volume at a unique time at which the image was recorded. Each 3D representation of the subject's brain volume shows a level of neuronal activation at the image's recording time at each three-dimensional point comprised by the brain volume. A difference between two activation levels may be represented in the image as a corresponding difference in color, brightness, density, or another characteristic of a voxel of the image. In some implementations, a level of activation of a region of a brain volume may be a function of a blood oxygenation level dependent (BOLD) signal that identifies a level of neuronal activation in that region. An fMRI series may be further analyzed to identify couplings between regions of a brain that may work together to perform a particular type of function or to respond to a specific class of stimulus, a relationship known as "functional connectivity." Such relationships may in some cases be inferred from correlations or covariances among time measurements associated with changes in levels of activation of such regions. If two regions, for example, activate simultaneously every time a subject receives a DBS signal, those two regions may be deemed to be functionally connected.

In certain embodiments, the DBS system 10 of FIG. 2 and the MRI scanner 86 of FIG. 4 may be employed in order to predict an optimal combination of DBS parameters that can be applied to obtain ideal symptom relief for a patient. The DBS system 10, and more specifically pulse generator 20 and electrodes 12, are controlled to stimulate the patient using a given set of DBS parameters (or inputted predicted set of DBS parameters). For example, DBS system 10 can utilize regular patterns of continuous or cycling stimulation with rectangular biphasic waveforms, with one or more of voltage, pulse width, frequency, stimulation direction, and the electrode contacts used to apply the stimulation waveform being modified. For the set of DBS parameters utilized, brain response data is collected through fMRI data acquisition, with the fMRI data acquisition being synchronized (in the case of cycling stimulation) with the stimulation provided by the DBS electrodes.

Figure 5:
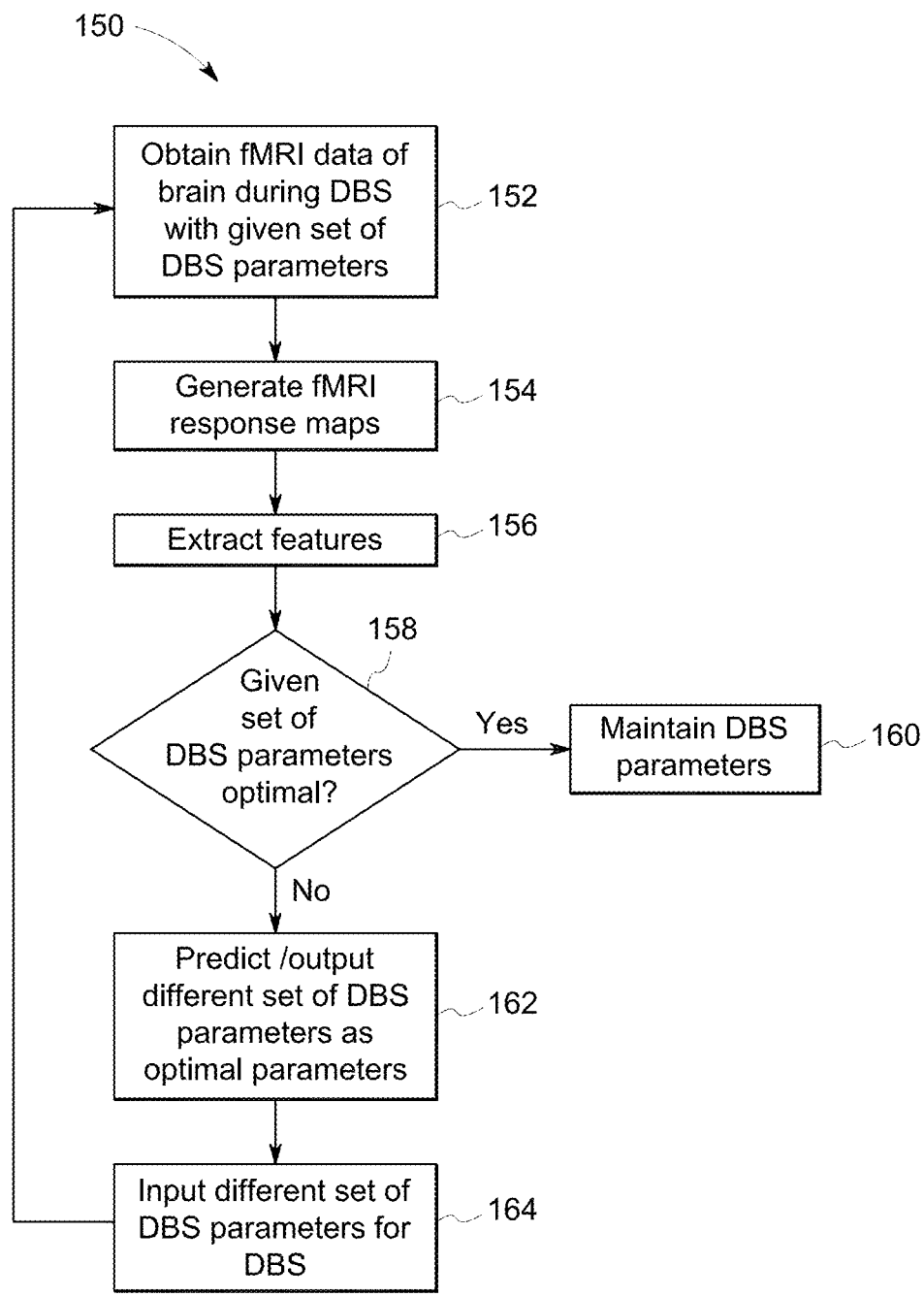
FIG. 5 is a flow chart of a method for optimizing DBS parameters for a patient, in accordance with aspects of the present disclosure.

FIG. 5 is a flow chart of a method 150 for optimizing DBS parameters for a patient. The steps of the method 150 may be performed by the system 1 in FIG. 1. Each of the steps of the method 150 may be performed automatically without user interaction or input. The method 150 occurs after the implantation of electrodes into the brain of the subject. The method 150 also occurs after acquiring fMRI scan data during DBS of the brain of the subject with a given set of DBS parameters. The method 150 may take on average about 1 hour which is significantly shorter than the current clinical DBS optimization process which may take on average about 1 year.

Figure 6:
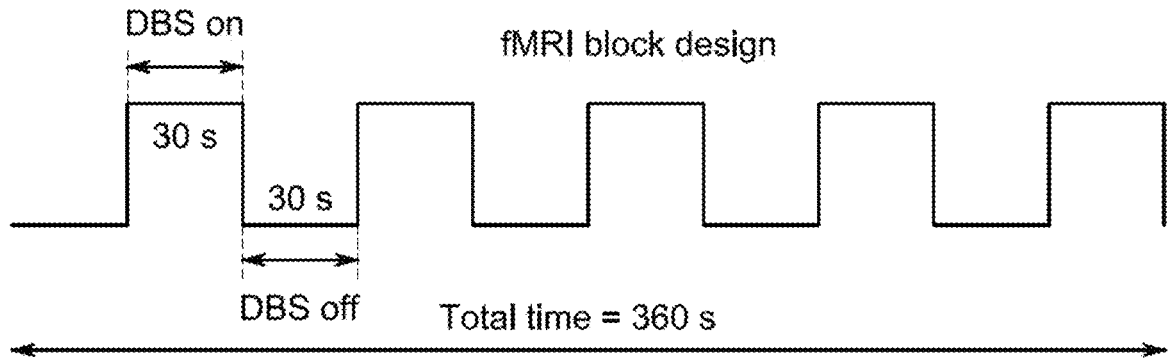
FIG. 6 is fMRI sequences acquired using a 30 second DBS OFF/ON cycling paradigm with a given set of DBS parameters, in accordance with aspects of the present disclosure.

The method 150 includes obtaining fMRI scan data of a brain of a subject acquired utilizing an MRI scanner (e.g., MRI scanner in FIG. 4) during DBS of the brain with a DBS system (e.g., DBS system 10 in FIG. 2) utilizing a given set of DBS parameters (e.g., first or initial set of parameters) (block 152). In certain embodiments, the fMRI scan data is acquired during utilization of an ON/OFF DBS cycling paradigm (e.g., 30 second DBS signal ON/OFF DBS cycling paradigm) for DBS electrode stimulation periods by the DBS system. An example of fMRI sequences acquired using a 30 second DBS OFF/ON cycling paradigm with a given set of DBS parameters is depicted in FIG. 6. As shown in FIG. 6, the fMRI sequences are acquired utilizing the MRI scanner in six-minute blocks using a 30 second DBS ON/OFF cycling paradigm.

The method 150 also includes generating fMRI response maps (e.g., statistical parametric maps) from the fMRI scan data (block 154). The brain response maps indicate which regions and/or structures of the brain become active or are non-active in response to DBS stimulation. As described in greater detail below, the fMRI response maps may be generated by subjecting the fMRI scan data (acquired during a 30 second DBS ON/OFF paradigm) to statistical parametric mapping with preprocessing steps such as slice correction, motion correction, rigid registration to a T1-weighted image, non-linear registration to a stand space such as the Montreal Neurological Institute (MNI) brain, and spatial smoothing. In certain embodiments, the fMRI scan data is also subjected to motion regression to account for artifacts due to patient head motion during data acquisition.

The method 150 further includes extracting, utilizing an unsupervised autoencoder-based neural network (e.g., unsupervised autoencoder-based neural network 8 in FIG. 1), subject specific features (e.g., latent vectors) from the fMRI response maps (block 156). The unsupervised autoencoder-based neural network is a deep learning-based neural network. The unsupervised autoencoder-based neural network automatically extracts features or latent vectors that are physiologically and neuro-functionally meaningful. The unsupervised autoencoder-based neural network reduces the fMRI response maps from an initial dimension of 91×96×96 to 256×3×3 latent vector. The extraction of the subject specific features or latent vectors from the fMRI response maps occurs without the specification of regions of interest and without any ROI-based normalization. Locations of fMRI responses may change in a patient's brain due to differences in disease conditions which potentially diminishes the accuracy of a region of interest-based feature extraction approach. In certain embodiments, other unsupervised feature extraction techniques may be utilized extracting subject specific features and in automating DBS optimization.

The method 150 still further includes determining, utilizing a deep-learning based DBS parameter classification model (e.g., DBS parameter classification model 9 in FIG. 1), whether the given set of DBS parameters are optimal DBS parameters for the subject based on the extracted subject specific features or latent vectors (block 158). The DBS parameter classification model utilized was trained via a multilayer perceptron neural network. In certain embodiments, the DBS parameter classification model may be trained utilizing a different type of neural network. In certain embodiments, the DBS parameter classification model may be trained utilizing a separate deep learning-based network architecture from the unsupervised autoencoder-based neural network. The DBS parameter classification model (based on the extracted subject specific features or latent vectors) classifies the given set of DBS parameters as either optimal or non-optimal. When the given set of DBS parameters are classified as optimal DBS parameters, the method 150 includes maintaining the given set of DBS parameters as the DBS parameters utilized by the DBS system for DBS (block 160).

When the given set of DBS parameters are classified as non-optimal DBS parameters, the method 150 includes predicting or outputting, utilizing a deep learning-based DBS parameter prediction model (e.g., DBS parameter prediction model 11 in FIG. 1), a different set (e.g., second set or subsequent set) of DBS parameters that are optimal DBS parameters for the subject based on the extracted subject specific features or latent vectors (block 162). The different set of DBS parameters may differ from the previous set (e.g., given set, first set, or initial set) of DBS parameters with regard to one or more DBS parameters. The DBS parameter prediction model was trained via a multilayer perceptron neural network. In certain embodiments, the DBS parameter prediction model may be trained utilizing a different type of neural network. In certain embodiments, the DBS parameter prediction model may be trained utilizing a separate deep learning-based network architecture from the unsupervised autoencoder-based neural network.

The method 150 yet further includes inputting the different set of DBS parameters (e.g., optimal DBS parameters) for DBS into the DBS system for utilization during subsequent DBS of the brain of the subject (block 164). In certain embodiments, the steps of the method 150 are repeated to determine if the different set of DBS parameters are truly the optimal DBS parameters. The steps of the method 150 may be iteratively repeated until the optimal DBS parameters are obtained for the subject.

Figure 7:
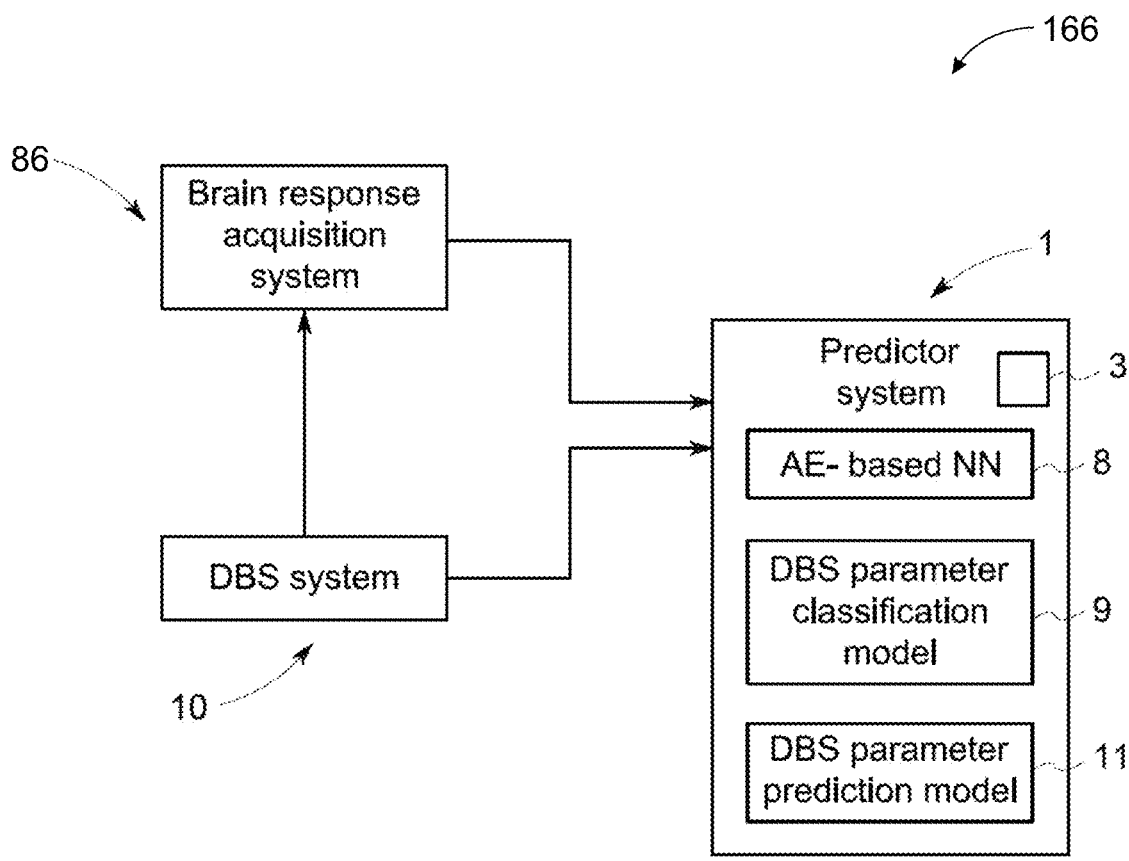
FIG. 7 is a schematic block diagram of a predictor system, DBS system, and brain response acquisition system forming a collective system for predicting optimal DBS parameters for DBS patient treatment, in accordance with aspects of the present disclosure.

Referring now to FIG. 7, a block schematic diagram of a system 166 for predicting optimal DBS parameters for a patient is illustrated. Included in the system 166 is a predictor system 1 such as shown in FIG. 1, a DBS system 10 such as shown in FIG. 2, and a brain response acquisition system 86 that, according to an exemplary embodiment, is an MRI scanner 86 as shown in FIG. 4. The predictor system 1, DBS system 10, and brain response acquisition system 86 are operatively connected to one another to provide for predicting optimal DBS parameters for a patient.

In certain embodiments, the DBS system 10 is controlled to send each of a plurality of DBS signals to one or more electrodes 12 (FIG. 2) surgically implanted within one or more regions of a patient brain, wherein in sending the plurality of DBS signals, the DBS system 10 is controlled to perform DBS utilizing given parameters. The brain response acquisition system 86 is synchronized with the DBS system 10 and controlled to collect brain response data resulting from each of the plurality of DBS signals. The prediction system 1 comprises a processor 3 programmed to extract automatically generate fMRI response maps of the patient brain, extract subject specific features or latent vectors (e.g. utilizing unsupervised autoencoder-based neural network 8), determine whether the utilized DBS parameters are optimal DBS parameters based on the subject specific features or the latent vectors (e.g., utilizing the DBS parameter classification model 9), and predict (when the utilized DBS parameters are not optimal) a different set of DBS parameters as optimal DBS parameters based on the subject specific features or the latent vectors (e.g., utilizing the DBS parameter prediction model 11. The DBS parameters utilized by the DBS system 10 and the optimal DBS parameters predicted by the prediction system 1 comprise one or more of signal voltage, frequency, pulse width, stimulation direction, and an activated contact selected from a plurality of contacts 23 on each of the one or more electrodes 12 (FIG. 3).

Figure 8:
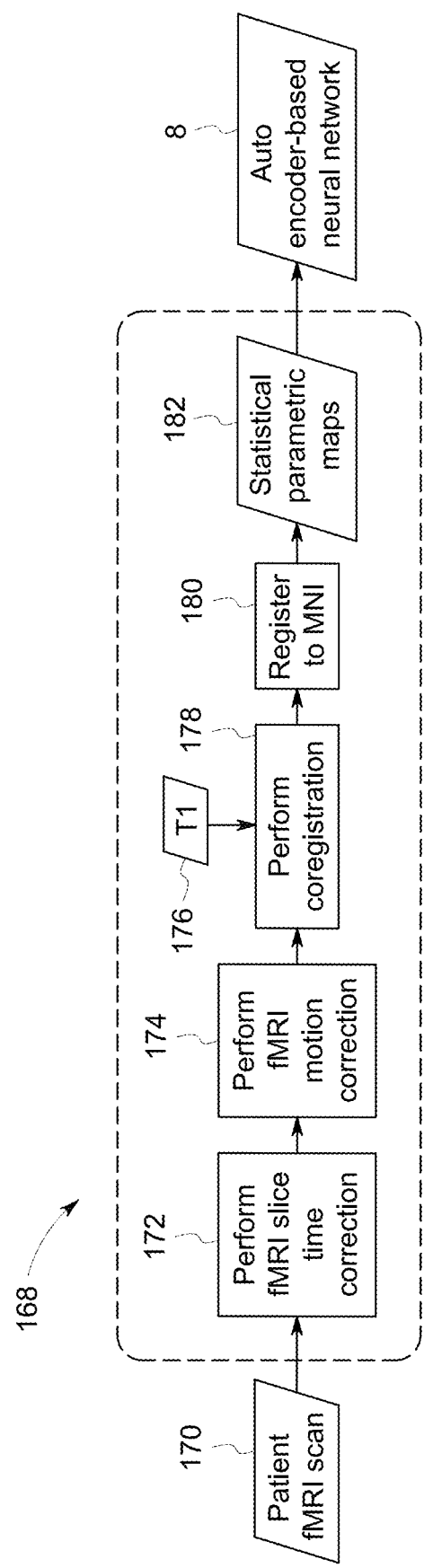
FIG. 8 is a flow chart of a method for generating fMRI response maps, in accordance with aspects of the present disclosure.

FIG. 8 is a flow chart of a method 168 for generating fMRI response maps. The method 168 may be performed by the system 1 in FIG. 1. The steps of the method 168 may be performed by the system 1 in FIG. 1. Each of the steps of the method 168 may be performed automatically without user interaction or input. The method 168 occurs after acquiring fMRI scan data 170 during DBS of the brain of the subject with a given set of DBS parameters (e.g. utilizing the 30 second DBS ON/OFF paradigm in FIG. 6).

The method 168 includes performing slice time correction on the fMRI scan data 170 (block 172). The method 168 also includes performing motion correction on the fMRI scan data 170 (block 174). The method 168 further includes performing coregistration (e.g., rigid registration) on the fMRI scan data 170 to a T1-weighted image 176 (block 178). The method 168 even further includes performing registration (e.g., non-linear registration) of the fMRI scan data 170 to a standard space such as MNI brain to generate statistical parametric maps 182 (e.g., fMRI response maps) (block 180). In certain embodiments, the method 168 includes spatial smoothing of the fMRI scan data 170 using a Gaussian kernel with a 6 millimeter full width at half maximum. The fMRI response maps are fed into the unsupervised autoencoder-based neural network 8.

Figure 9:
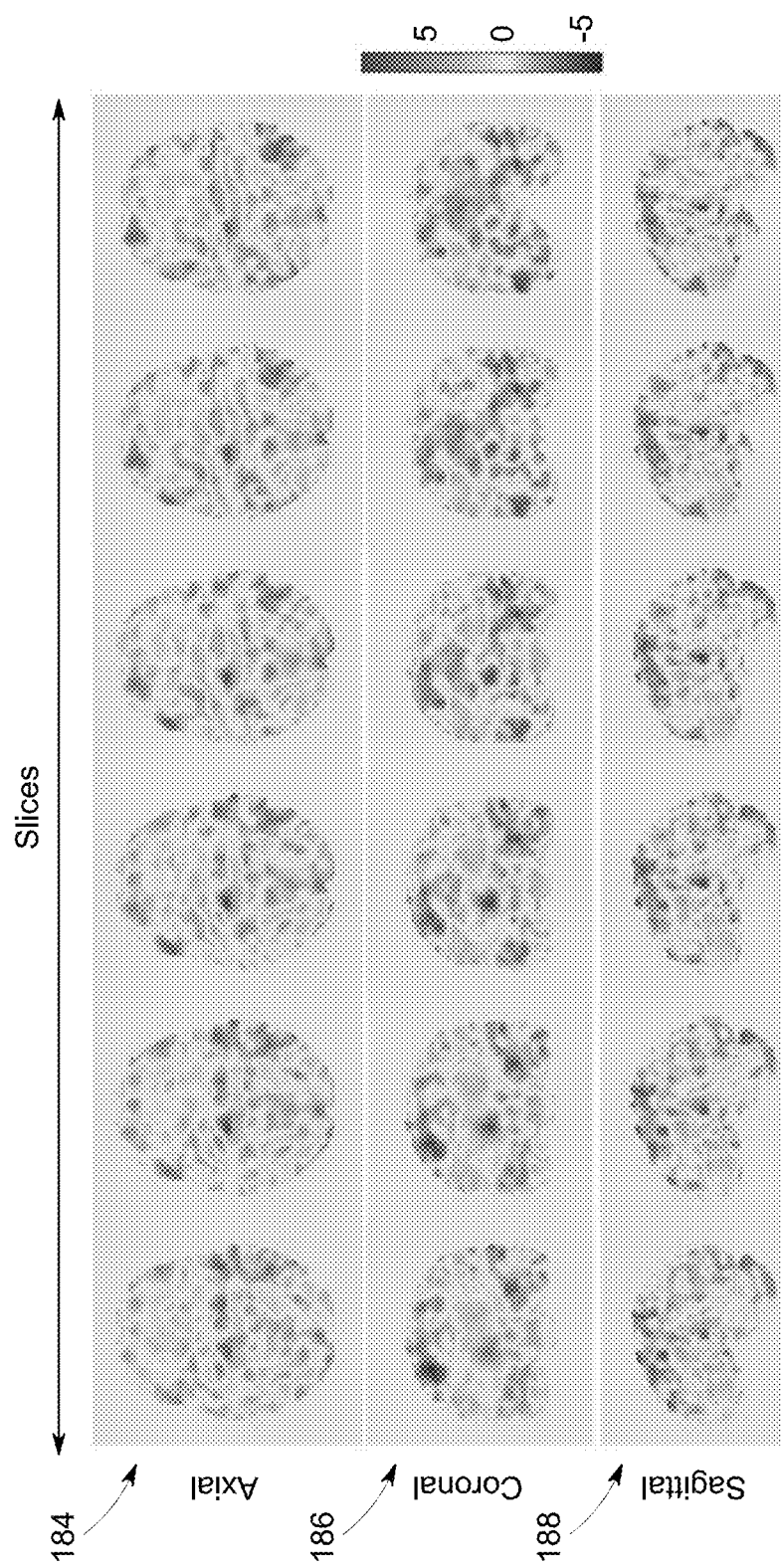
FIG. 9 are representative fMRI response maps obtained from patients undergoing DBS treatment.

FIG. 9 are representative fMRI response maps obtained from patients undergoing DBS treatment (e.g., as generated utilizing the method 168 in FIG. 8). A top row 184 represents axial slices of fMRI response maps of brains of patients. A middle row 186 represents coronal slices of fMRI response maps of brains of patients. A bottom row 188 represents sagittal slices of fMRI response maps of brains of patients. The fMRI response maps are fed into the unsupervised autoencoder-based neural network for the extraction of subject specific features or latent vectors, which are used for the classification and prediction of optimal DBS parameters.

Figure 10:
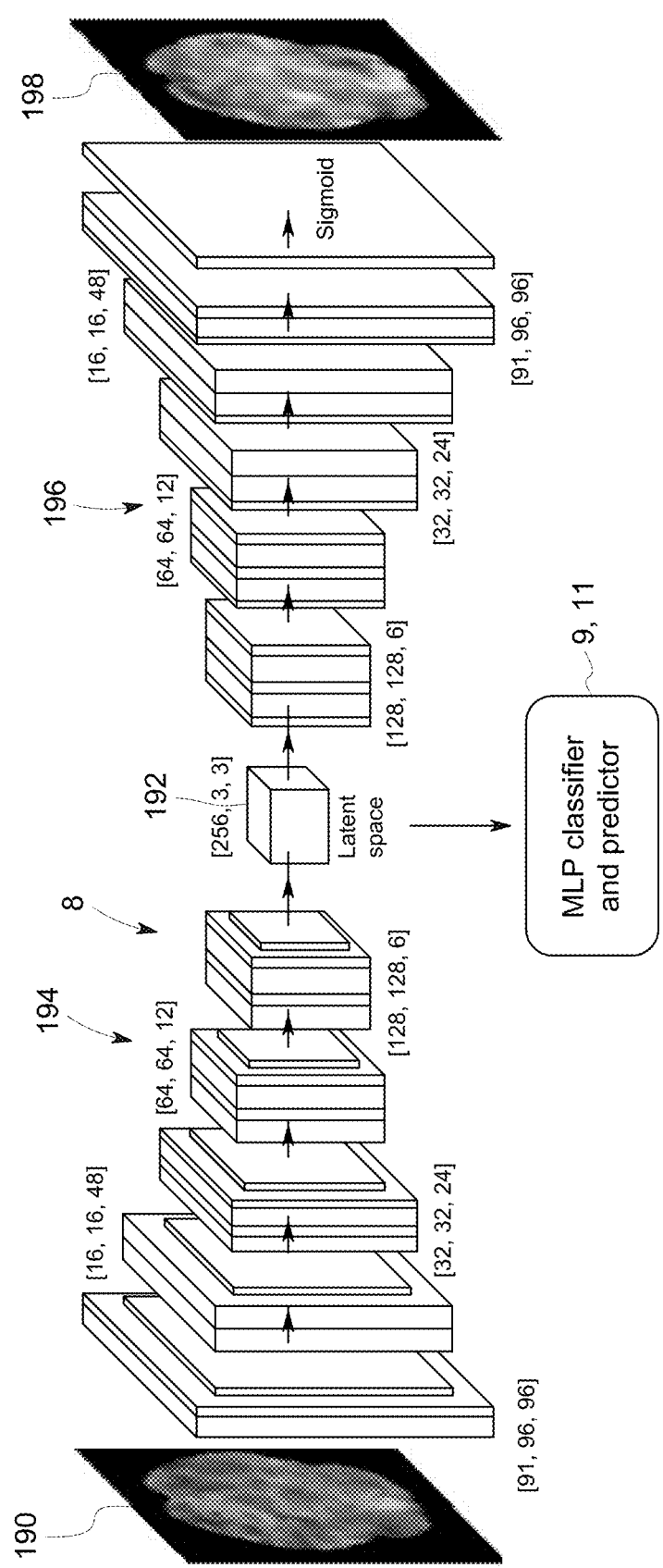
FIG. 10 is a schematic diagram of an unsupervised autoencoder-based neural network, in accordance with aspects of the present disclosure.

FIG. 10 is a schematic diagram of the unsupervised autoencoder-based neural network 8. The unsupervised autoencoder-based neural network 8 takes the automatically generated fMRI response maps 190 and extracts physiologically and neuro-functionally meaningful subject specific features or latent vectors 192. The unsupervised autoencoder-based neural network 8 reduces the fMRI response maps 190 from an initial dimension of 91×96×96 to a 256×3×3 latent vector 192. The unsupervised autoencoder-based neural network 8 includes an encoder 194 for generating the latent vector 192 and a decoder 196 for generating an output 198 (e.g. reconstructed fMRI response map) from the latent vector 192. The subject specific features or latent vectors are provided to the deep learning-based DBS parameter classifier model 9 and the deep learning-based DBS parameter prediction model 11.

Figure 11A:
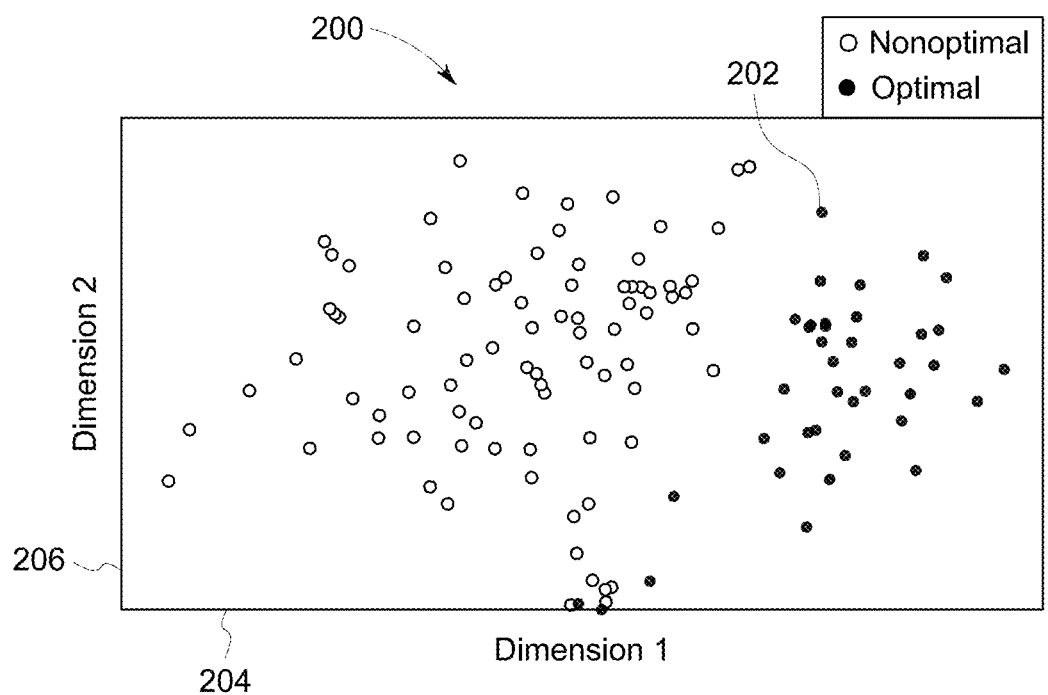
FIGS. 11A and 11B are visualizations (e.g. graphs) of extracted features utilizing the disclosed techniques and prior art techniques, respectively, in accordance with aspects of the present disclosure.
Figure 11B:
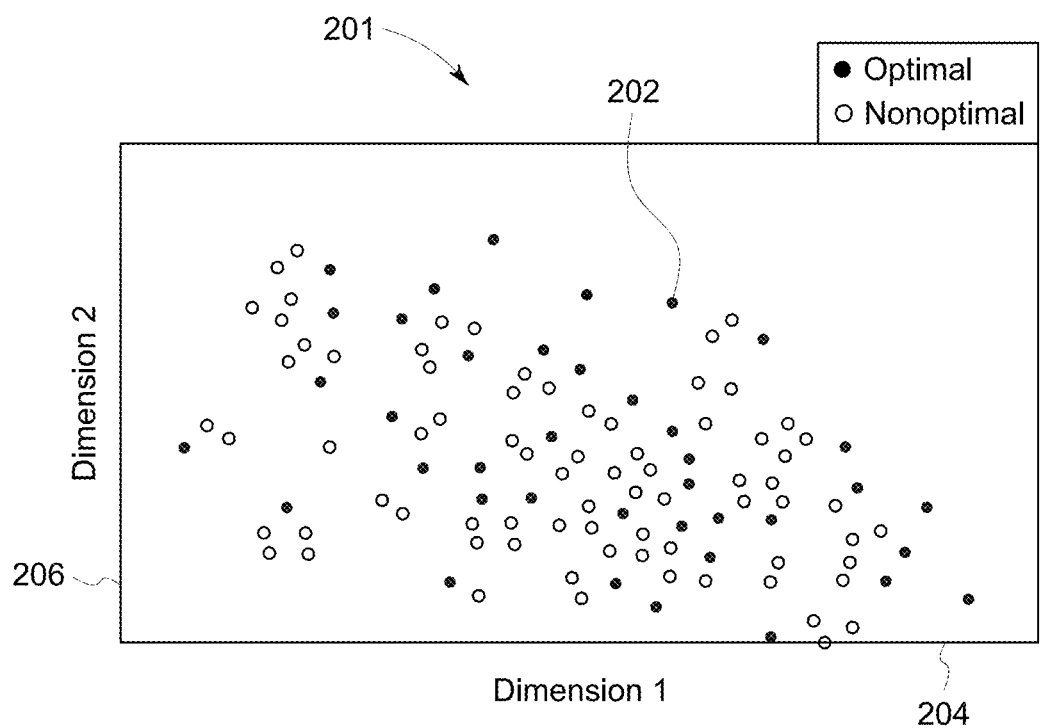

FIGS. 11A and 11B are visualizations 200, 201 (e.g. graphs) of extracted features utilizing the disclosed techniques and prior art techniques, respectively FIG. 11 is a visualization 200 (e.g. graph) of extracted features 202. In FIG. 11A, the extracted features 202 (e.g., latent vectors 202) are extracted from fMRI response maps by the unsupervised autoencoder-based neural network 8. In FIG. 11B, the extracted features 202 are extracted utilizing region of interest-based feature extraction (e.g., parcel-based feature extraction). The visualizations 200, 201 are t-Distributed Stochastic Neighbor Embedding (t-SNE) visualizations of vectors. The X-axis 204 represents a first dimension and the Y-axis 206 represents a second dimension. The solid circles represent extracted features 202 derived from fMRI response maps acquired from DBS treatment with optimal DBS parameters. The open circles represent extracted features 202 derived from fMRI response maps acquired from DBS treatment with non-optimal DBS parameters. Comparing FIGS. 11A and 11*i*, the extracted features 202 derived from the disclosed techniques in FIG. 11A are physiologically and neuro-functionally more meaningful than those extracted features 202 derived utilizing parcel-based feature extraction in FIG. 11B.

Figure 12:
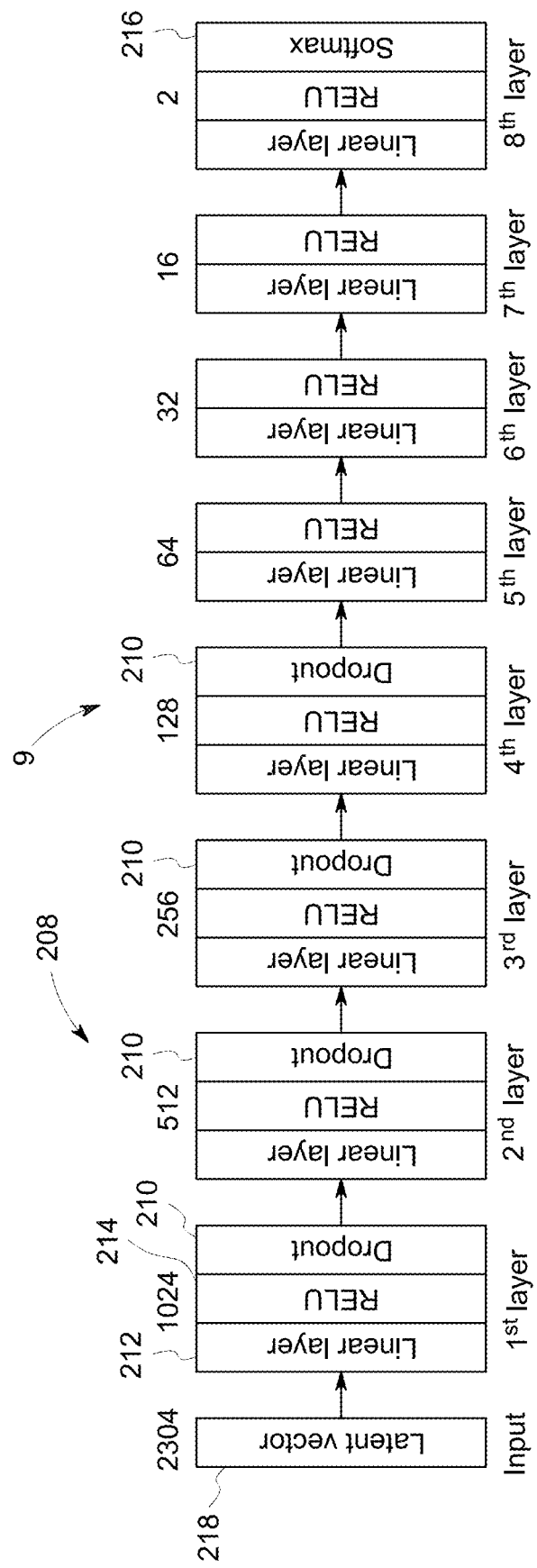
FIG. 12 is a schematic diagram of a multilayer perceptron neural network for building a DBS parameter classification model, in accordance with aspects of the present disclosure.

FIG. 12 is a schematic diagram of a multilayer perceptron neural network 208 for building the deep learning-based DBS parameter classification model 9. The multilayer perceptron neural network 208 is utilized to train the DBS parameter classification model 9. The number of layers and a structure of the multilayer perceptron neural network 208 may vary. As depicted, the multilayer perceptron neural network 208 includes 8 layers that includes 4 dropout layers 210. The dropout layers 210 prevent overfitting. Each layer includes a linear layer 212 and a rectified linear unit (ReLU) layer 214. The first, second, third, and fourth layers each include the dropout layer 210. The eighth layer for generating an output (e.g., two-class optimization status of DBS parameter settings) includes a SoftMax layer 216. The latent vector 218 is input into the first layer. In certain embodiments, other types of neural networks may be utilized to train the DBS parameter classification model 9. In certain embodiments, the DBS parameter prediction model 9 may be trained utilizing a separate deep learning-based network architecture from the unsupervised autoencoder-based neural network.

Figure 13:
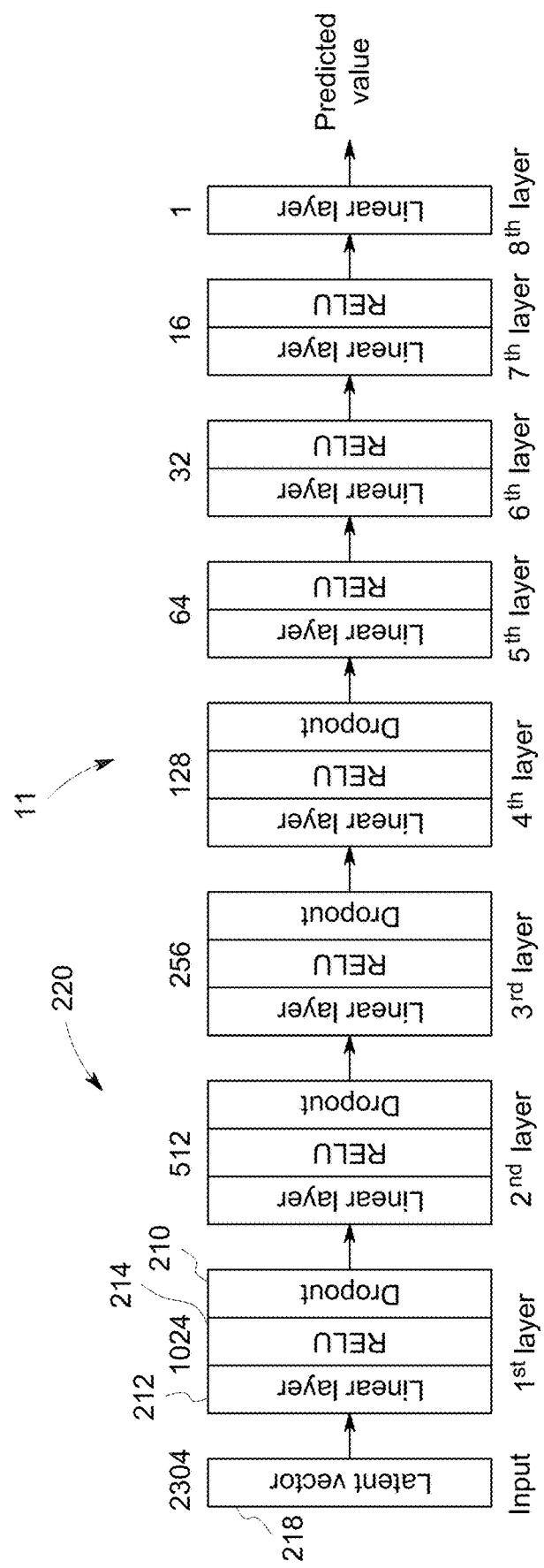
FIG. 13 is a schematic diagram of a multilayer perceptron neural network for building a DBS parameter prediction model, in accordance with aspects of the present disclosure.

FIG. 13 is a schematic diagram of a multilayer perceptron neural network 220 for building the deep learning-based DBS parameter prediction model 11. The multilayer perceptron neural network 220 is utilized to train the DBS parameter prediction model 11. The number of layers and a structure of the multilayer perceptron neural network 220 may vary. As depicted, the multilayer perceptron neural network 220 includes 8 layers that includes 4 dropout layers 210. The dropout layers 210 prevent overfitting. Each layer includes a linear layer 212. All layer, except the eight layer, includes a rectified linear unit (ReLU) layer 214. The first, second, third, and fourth layers each include the dropout layer 210. The eighth layer outputs optimized DBS parameter settings. The latent vector 218 is input into the first layer. In certain embodiments, other types of neural networks may be utilized to train the DBS parameter prediction model 11. In certain embodiments, the DBS parameter prediction model 11 may be trained utilizing a separate deep learning-based network architecture from the unsupervised autoencoder-based neural network.

Figure 14A:
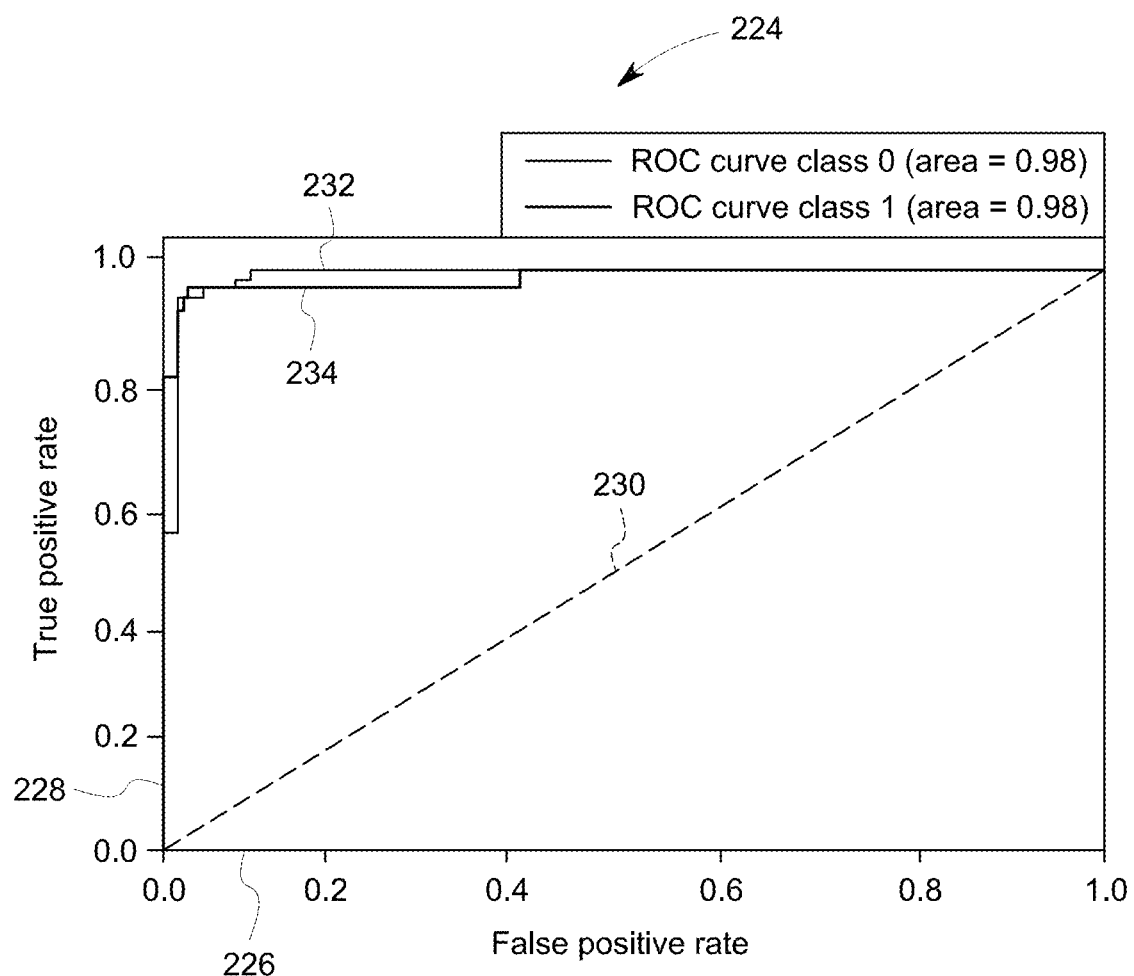
FIGS. 14A-14C illustrate performance of the DBS parameter classification model in FIG. 12.
Figures 14B, 14C:
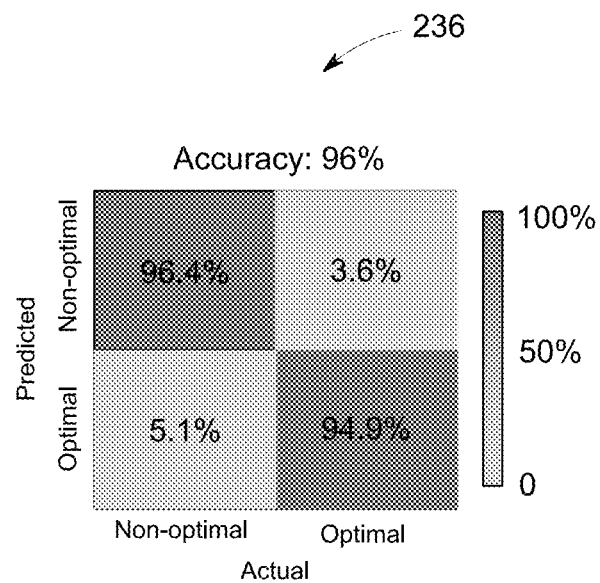

FIGS. 14A-14C illustrate performance of the DBS parameter classification model in FIG. 12. FIG. 14A is a graph 224 of a receiver operating characteristics curve that illustrates the diagnostic ability of the binary classification system of the DBS parameter classification model as its discrimination threshold varies. The X-axis 226 of the graph 224 represents a false positive rate. The Y-axis 228 of the graph 224 represents a true positive rate. Dashed line 230 represents a random classifier. Plots 232, 234 represent the two classes (optimal, non-optimal). Both plots 232, 234 are located far above the dashed line 230 indicating that they are very good classifiers. FIG. 14B is a table 236 of a confusion matrix that illustrates the performance of the DBS parameter classification model. The labels on the left side of the table 236 indicate the predicted classifications (non-optimal and optimal) and the labels on the bottom of the table 236 indicate the actual classifications (non-optimal and optimal). The table 236 indicates that the DBS parameter classification model is highly accurate (with an accuracy of 96 percent). FIG. 14C is a table 238 listing various parameters related to the performance of the DBS parameter model from a 5-fold cross-validation framework. As indicated in the table, the DBS parameter model has an accuracy of approximately 96 percent, a precision of approximately 95 percent, a recall of approximately 92 percent, and a F1 Score of approximately 93 percent.

Figure 15A:
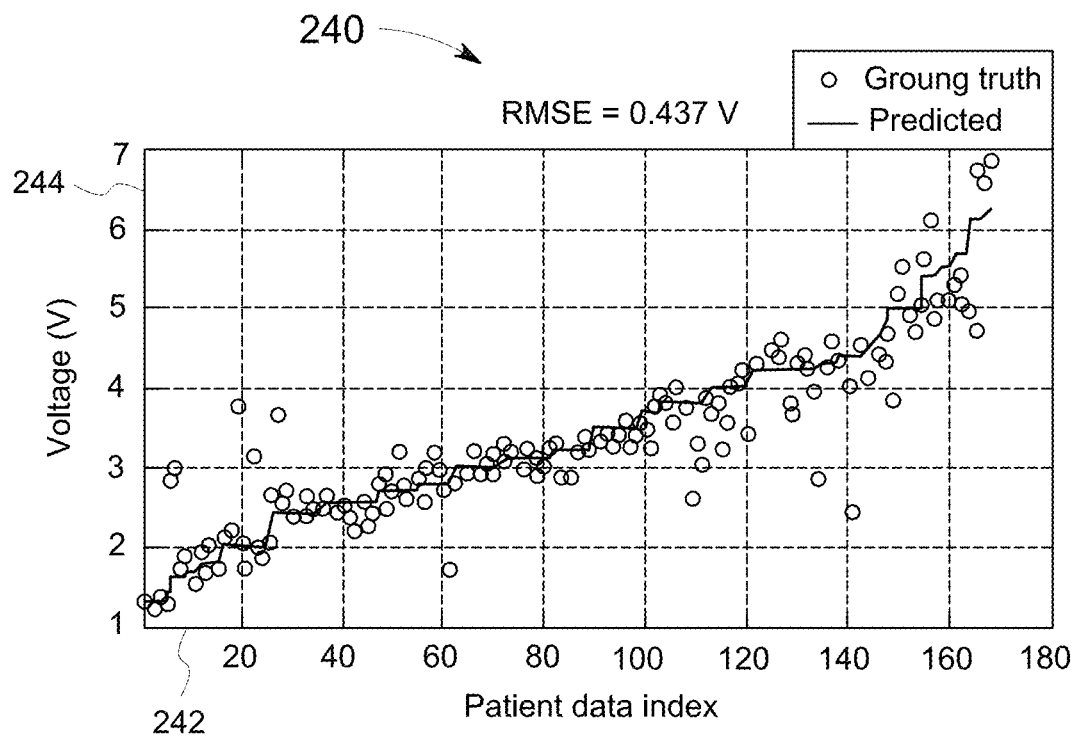
FIGS. 15A-15E illustrate performance of the DBS parameter prediction model in FIG. 13.
Figure 15B:
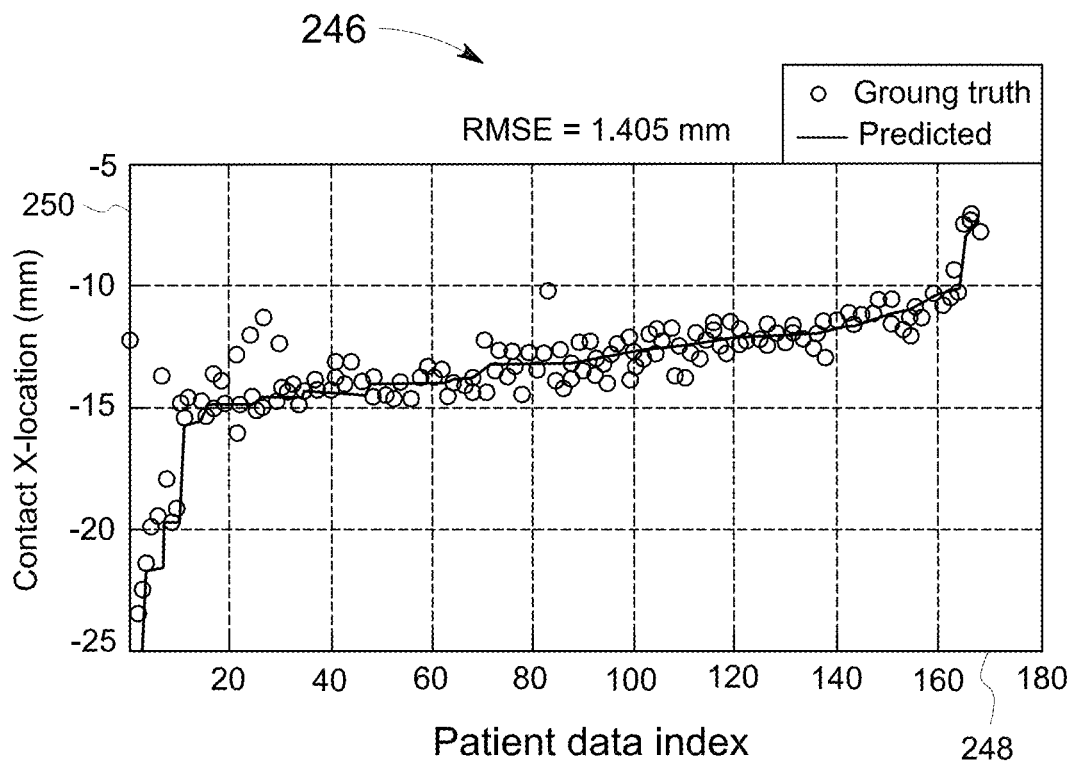
Figure 15C:
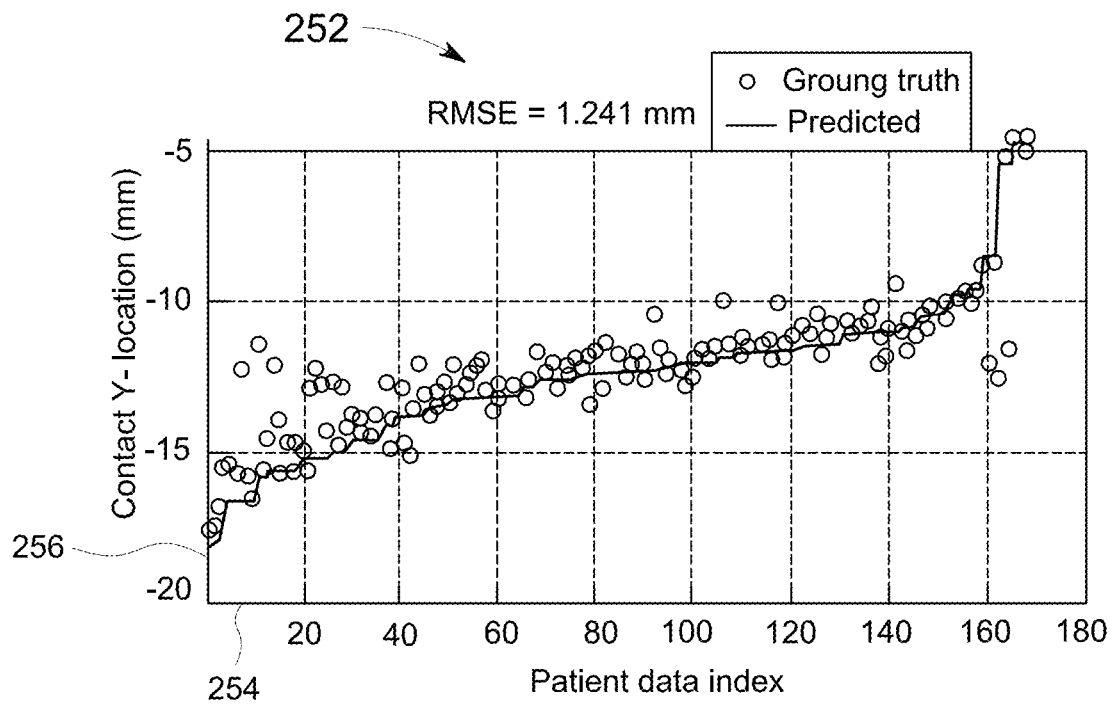
Figure 15D:
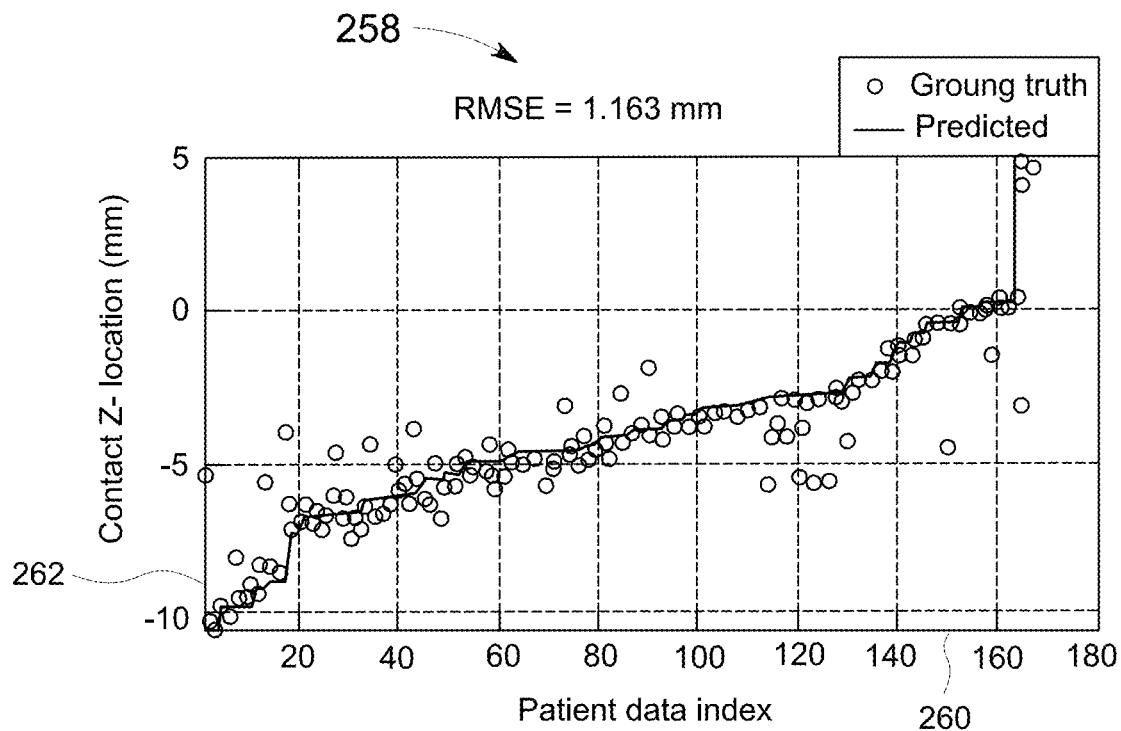
Figures 15E, 16:
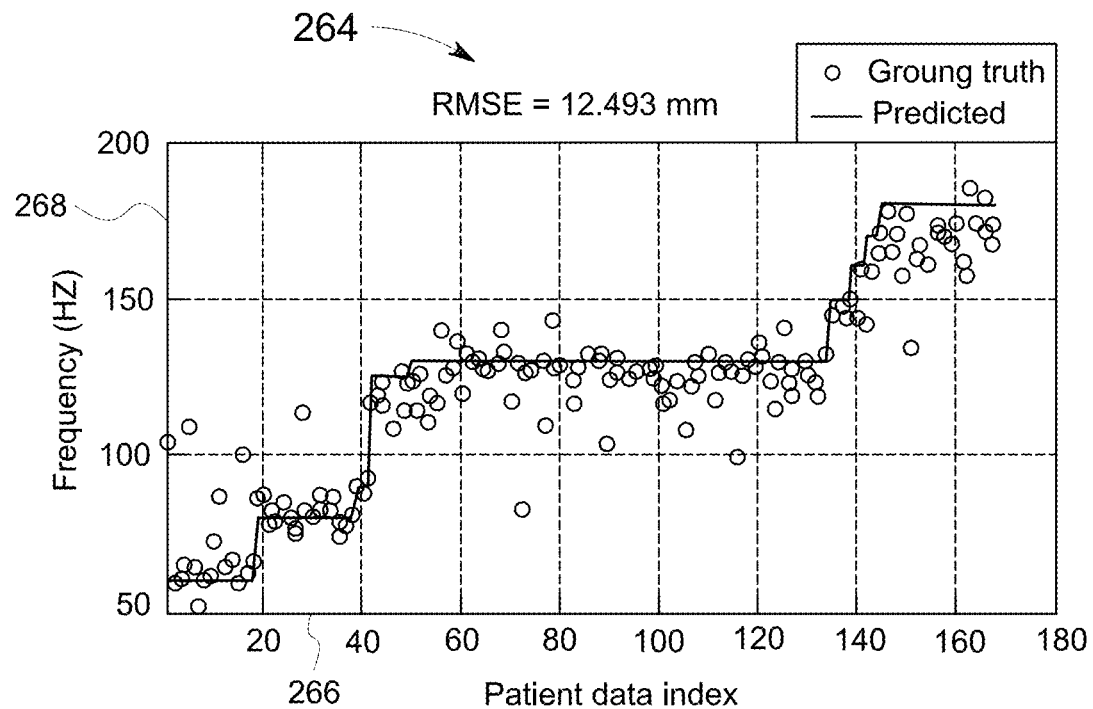
FIG. 16 illustrates accuracy of the DBS parameter prediction model in FIG. 13.

FIGS. 15A-15E illustrate performance of the DBS parameter prediction model in FIG. 13. FIGS. 15A-15E illustrate the root-mean-square error (RMSE) of the DBS parameter prediction model obtained with a 5-fold cross validation framework for a variety of parameters. FIG. 15A is a graph 240 of the DBS parameter prediction model with respect to DBS voltage with the X-axis 242 representing a patient data index and the Y-axis 244 representing DBS voltage. The RMSE of the voltage prediction result is also indicated. FIG. 15B is a graph 246 of the DBS parameter prediction model with respect to contact X-location with the X-axis 248 representing a patient data index and the Y-axis 250 representing X-contact location. The RMSE of the X-contact location prediction result is also indicated. FIG. 15C is a graph 252 of the DBS parameter prediction model with respect to contact-Y location with the X-axis 254 representing a patient data index and the Y-axis 256 representing contact-Y location. The RMSE of the Y-contact location prediction result is also indicated. FIG. 15D is a graph 258 of the DBS parameter prediction model with respect to contact-Z location with the X-axis 260 representing a patient data index and the Y-axis 262 representing contact-Z location. The RMSE of the Z-contact location prediction result is also indicated. FIG. 15E is a graph 264 of the DBS parameter prediction model with respect to frequency with the X-axis 266 representing a patient data index and the Y-axis 268 representing frequency. The RMSE of the frequency prediction result is also indicated.

FIG. 16 illustrates accuracy of the DBS parameter prediction model in FIG. 13. FIG. 16 includes a table 270 that indicates the accuracy of the DBS parameter prediction model in predicting various DBS parameters (e.g., voltage, frequency, contact X-location, contact Y-location, and contact Z-location) at 10 percent tolerance and 15 percent tolerance.

Technical effects of the disclosed subject matter include enabling optimal DBS parameters to be obtained in a single day clinical visit as opposed to a number of months typically needed to obtain empirically optimized DBS parameters. As a result, the amount of time and money spent by the patient is reduced and the number of patients that may receive DBS is increased. In addition, the disclosed techniques, without utilizing region of interest (ROI)-based feature selection and without any ROI-based normalization, have a higher overall accuracy to other techniques with regard to obtaining optimal DBS parameters. Further, the disclosed techniques are configured to handle the number of possible additional stimulation parameters provided by newer DBS electrodes.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the invention, including making and using any devices or systems and performing any incorporated methods. The patentable scope of the present subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for optimizing deep brain stimulation (DBS) parameters for a subject, comprising:
    a memory encoding processor-executable routines;
    a processor configured to access the memory and to execute the processor-executable routines, wherein the routines, when executed by the processor, cause the processor to automatically:

obtain functional magnetic resonance imaging (MRI) data of a brain of the subject acquired utilizing an MRI system during DBS of the brain with a DBS system utilizing a first set of DBS parameters;

generate functional MRI response maps from the functional MRI data;

extract, utilizing an unsupervised autoencoder-based neural network, subject specific features from the functional MRI response maps, wherein the subject specific features are physiologically and neuro-functionally meaningful latent vectors, and wherein extracting the subject specific features from the functional MRI response maps occurs without specification of regions of interest (ROI) and without any ROI-based normalization;

determine, utilizing a deep learning-based DBS parameter classification model, whether the first set of DBS parameters are optimal DBS parameters for the subject based on the subject specific features; and when the first set of DBS parameters are not the optimal DBS parameters, predict, utilizing a deep learning-based DBS parameter prediction model, a second set of DBS parameters that are the optimal DBS parameters for the subject based on the subject specific features.

2. The system of claim 1, wherein the routines, when executed by the processor, cause the processor to automatically:

obtain additional functional MRI data of the brain of subject acquired utilizing the MRI system during DBS of the brain with the DBS system utilizing the second set of DBS parameters;

generate additional functional MRI response maps from the additional functional MRI data;

extract, utilizing the unsupervised autoencoder-based neural network, additional subject specific features from the additional functional MRI response maps;

determine, utilizing the deep learning-based DBS parameter classification model, whether the second set of DBS parameters are the optimal DBS parameters for the subject based on the additional subject specific features; and when the second set of DBS parameters are not the optimal DBS parameters, predict, utilizing the deep learning-based DBS parameter prediction model, a third set of DBS parameters that are the optimal DBS parameters for the subject based on the additional subject specific features.

3. The system of claim 2, wherein the routines, when executed by the processor, cause the processor to automatically, when the second set of DBS parameters are the optimal DBS parameters, maintain the second set of DBS parameters for the DBS system to utilize during DBS of the brain of the subject.

4. The system of claim 1, wherein the routines, when executed by the processor, cause the processor to automatically input the second set of DBS parameters into the DBS system to utilize during DBS of the brain of the subject.

5. The system of claim 1, wherein the deep learning-based DBS parameter classification model and the deep learning-based DBS parameter prediction model are each trained by a respective deep-learning network architecture different from the unsupervised autoencoder-based neural network.

6. The system of claim 1, further comprising the DBS system, wherein the DBS system is configured to be controlled to send each of a plurality of DBS signals to one or more electrodes surgically implanted within one or more regions of the brain of the subject utilizing DBS parameters.

7. A computer-implemented method for optimizing deep brain stimulation (DBS) parameters for a subject, comprising automatically:

obtaining, via a processor, functional magnetic resonance imaging (MRI) data of a brain of the subject acquired utilizing an MRI system during DBS of the brain with a DBS system utilizing a first set of DBS parameters;

generating, via the processor, functional MRI response maps from the functional MRI data;

extracting, via the processor, utilizing an unsupervised autoencoder-based neural network, subject specific features from the functional MRI response maps, wherein the subject specific features are physiologically and neuro-functionally meaningful latent vectors, and wherein extracting the subject specific features from the functional MRI response maps occurs without specification of regions of interest (ROI) and without any ROI-based normalization;

determining, via the processor, utilizing a deep learning-based DBS parameter classification model, whether the first set of DBS parameters are optimal DBS parameters for the subject based on the subject specific features; and when the first set of DBS parameters are not the optimal DBS parameters, predicting, via the processor, utilizing a deep learning-based DBS parameter prediction model, a second set of DBS parameters that are the optimal DBS parameters for the subject based on the subject specific features.

8. The computer-implemented method of claim 7, further comprising automatically:

obtaining, via the processor, additional functional MRI data of the brain of subject acquired utilizing the MRI system during DBS of the brain with the DBS system utilizing the second set of DBS parameters;

generating, via the processor, additional functional MRI response maps from the additional functional MRI data;

extracting, via the processor, utilizing the unsupervised autoencoder-based neural network, additional subject specific features from the additional functional MRI response maps;

determining, via the processor, utilizing the deep learning-based DBS parameter classification model, whether the second set of DBS parameters are the optimal DBS parameters for the subject based on the additional subject specific features; and when the second set of DBS parameters are not the optimal DBS parameters, predicting, via the processor, utilizing the deep learning-based DBS parameter prediction model, a third set of DBS parameters that are the optimal DBS parameters for the subject based on the additional subject specific features.

9. The computer-implemented method of claim 8, further comprising, when the second set of DBS parameters are the optimal DBS parameters, automatically maintaining, via the processor, the second set of DBS parameters for the DBS system to utilize during DBS of the brain of the subject.

10. The computer-implemented method of claim 7, further comprising automatically inputting, via the processor, the second set of DBS parameters into the DBS system to utilize during DBS of the brain of the subject.

11. The computer-implemented method of claim 7, wherein the deep learning-based DBS parameter classification model and the deep learning-based DBS parameter prediction model are each trained by a respective deep-learning network architecture different from the unsupervised autoencoder-based neural network.

12. A non-transitory computer-readable medium, the computer-readable medium comprising processor-executable code that when executed by a processor, causes the processor to automatically:
   obtain functional magnetic resonance imaging (MRI) data of a brain of a subject acquired utilizing an MRI system during deep brain stimulation (DBS) of the brain with a DBS system utilizing a first set of DBS parameters;
   generate functional MRI response maps from the functional MRI data;
   extract, utilizing an unsupervised autoencoder-based neural network, subject specific features from the functional MRI response maps, wherein the subject specific features are physiologically and neuro-functionally meaningful latent vectors, and wherein extracting the subject specific features from the functional MRI response maps occurs without specification of regions of interest (ROI) and without any ROI-based normalization;
   determine, utilizing a deep learning-based DBS parameter classification model, whether the first set of DBS parameters are optimal DBS parameters for the subject based on the subject specific features; and
   when the first set of DBS parameters are not the optimal DBS parameters, predict, utilizing a deep learning-based DBS parameter prediction model, a second set of DBS parameters that are the optimal DBS parameters for the subject based on the subject specific features.

13. The non-transitory computer-readable medium of claim 12, wherein the processor-executable code, when executed by the processor, causes the processor to automatically:
   obtain additional functional MRI data of the brain of subject acquired utilizing the MRI system during DBS of the brain with the DBS system utilizing the second set of DBS parameters;
   generate additional functional MRI response maps from the additional functional MRI data;
   extract, utilizing the unsupervised autoencoder-based neural network, additional subject specific features from the additional functional MRI response maps;
   determine, utilizing the deep learning-based DBS parameter classification model, whether the second set of DBS parameters are the optimal DBS parameters for the subject based on the additional subject specific features; and
   when the second set of DBS parameters are not the optimal DBS parameters, predict, utilizing the deep learning-based DBS parameter prediction model, a third set of DBS parameters that are the optimal DBS parameters for the subject based on the additional subject specific features.

14. The non-transitory computer-readable medium of claim 13, wherein the processor-executable code, when executed by the processor, causes the processor to, when the second set of DBS parameters are the optimal DBS parameters, automatically maintain the second set of DBS parameters for the DBS system to utilize during DBS of the brain of the subject.

15. The non-transitory computer-readable medium of claim 12, wherein the processor-executable code, when executed by the processor, causes the processor to automatically input the second set of DBS parameters into the DBS system to utilize during DBS of the brain of the subject.

* * * * *